United States Patent [19]
Hasegawa

[11] Patent Number: 5,778,276
[45] Date of Patent: Jul. 7, 1998

[54] IMAGE FORMING APPARATUS HAVING AUTOMATIC PRELIMINARY SCANNING START FUNCTION

[75] Inventor: Yutaka Hasegawa, Tokyo, Japan

[73] Assignee: Ricoh Co., Ltd., Tokyo, Japan

[21] Appl. No.: 598,684

[22] Filed: Feb. 8, 1996

[30] Foreign Application Priority Data

| Feb. 8, 1995 | [JP] | Japan | 7-019626 |
| Jan. 26, 1996 | [JP] | Japan | 8-011406 |

[51] Int. Cl.$^6$ ............................................. G03G 15/00
[52] U.S. Cl. .................... 399/17; 355/75; 399/376; 399/380
[58] Field of Search ............... 399/16, 17, 45, 399/376, 377, 379, 380; 355/75; 358/449

[56] References Cited

U.S. PATENT DOCUMENTS

| 4,579,445 | 4/1986 | Hasegawa | 399/86 |
| 4,939,553 | 7/1990 | Sato et al. | 399/377 X |
| 5,198,859 | 3/1993 | Soma et al. | 355/75 X |
| 5,218,408 | 6/1993 | Inada et al. | 399/376 |
| 5,223,904 | 6/1993 | Umezawa | 399/376 |
| 5,500,725 | 3/1996 | Takasu et al. | 399/17 |

*Primary Examiner*—William J. Royer
*Attorney, Agent, or Firm*—Oblon, Spivak, McClelland, Maier & Neustadt, P.C.

[57] ABSTRACT

An image forming apparatus having a preliminary scanning function which is automated by detecting a selection of at least one of an automatic color selecting mode and a letter and photo mixed mode, an existence of an original document on a contact glass, and a movement of an original platen cover from an open state to a closed state. During performing the preliminary scanning function, a depression of a copy start button is not ignored but accepted, and therefore, when the copy start button is depressed, a scanning process for forming an image starts automatically upon a completion of the preliminary scanning. In addition, various instructions, such as a numeric input for instructing, as an example, a number of copies are accepted. The start of preliminary scanning may be selected by operator preference to start when detecting existence of an original document or when detecting an instruction input by the copy start key. The distance to be scanned during a preliminary scanning process and during the scanning process is controlled based upon feedback signals from an original document size detect sensor so as to minimize the scanning area in accordance with the size of the original document.

30 Claims, 15 Drawing Sheets

|  | SENSOR 81 (LENGTH 1) | | | SENSOR 83 (LENGTH 2) | SENSOR 82 (WIDTH) | | |
|---|---|---|---|---|---|---|---|
|  | 1 | 2 | 3 | 4 | 5 | 6 | 7 |
| A3 LANDSCAPE | ● | ● | ● | ● | ● | ● | ● |
| B4 LANDSCAPE | × | ● | ● | ● | ● | ● | ● |
| A4 LANDSCAPE | × | × | × | ● | ● | ● | × |
| B5 LANDSCAPE | × | × | × | ● | ● | × | × |
| A5 LANDSCAPE | × | × | × | ● | × | × | × |
| A4 PORTRAIT | × | × | × | ● | ● | ● | ● |
| B4 PORTRAIT | × | × | × | × | ● | ● | ● |
| A5 PORTRAIT | × | × | × | × | ● | ● | × |
| NON-STANDARD | × | × | × | × | × | × | × |

FIG.9

IMAGE FORMING APPARATUS HAVING AUTOMATIC PRELIMINARY SCANNING START FUNCTION

BACKGROUND OF THE INVENTION

1. Field of the Invention

This invention relates to an image forming apparatus having a preliminary scanning function, and more particularly to an image forming apparatus capable of performing automatically a preliminary scanning function. The present invention further relates to an image forming apparatus allowing an operator to input copying instructions during a time of a preliminary scanning process for shortening a copying time.

2. Discussion of the Background

As the types of images to be reproduced by a conventional digital copying machine expands widely from a simple text based document to a colorful magazine which includes both letters and photos, it has been proposed to incorporate in a digital copying machine a preliminary scanning process, which is to be performed prior to a scanning process for forming an image, for the purpose of analyzing and determining a characteristic of an image of an original document, so that various parameters of the machine are adjusted accordingly in accordance with the characteristic of the image for accomplishing a reproduction of the image in a most suitable manner.

Generally, the digital copying machine starts to perform, when a copy start button is depressed, followed by the noted preliminary scanning process and then, upon a completion of the preliminary scanning process, the machine automatically starts a scanning process for forming an image.

In such a preliminary scanning, the nature of the scanned image is typically determined, such as whether the scanned image is a full color image or not, a letter image or not, a screened dot image or not, or, a photo image or not. Further, a physical size of an original document is judged in some cases.

The machine then selects, from among various copying modes which are prescribed beforehand for various kinds of images, a mode which is suitable for reproducing the image based upon the nature of the image determined in the preliminary scanning, for example, a full color mode which is suitable for reproducing a color image, in case the scanned image is determined to be a color image, and various parameters of the machine are adjusted as prescribed for such mode accordingly.

There are generally provided, as a copying mode, such modes as a letter mode for copying a letter based document, a photo mode for copying a photo imaged document, a letter and photo mixed mode, in which letter images and photo images in an original document are automatically distinguished by the preliminary scanning, for copying a document including both letters and photos, a black and white mode for copying a black and white document, a full color mode for copying a full colored document, and an automatic color selecting mode, in which a selection of the black and white mode or the full color mode is automatically performed by the preliminary scanning, for copying either a document in black and white or a document in full color.

Such a preliminary scanning function is well known in the art and is commonly employed in a range of image forming machines, such as a digital copying machine and the like.

However, the preliminary scanning has the drawback that the first copy time, which is commonly measured from a depression of the copy start key until a physical output of a copy is obtained, and which is considered as one of important features related to the productivity of the digital copying machine, becomes relatively longer because the time for preliminary scanning is included as part of the first copy time.

Further, where the preliminary scanning performs document size detection in addition to analyzing and determining the nature of an image of an original document, the first copy time becomes relatively longer due to the fact that the whole area on the contact glass is scanned to detect the size of the original document.

In the meantime, rather a mechanically designed proposal has been made to provide an automatic copy start function in the official gazette for Laid Open Patent Application TOKUKAI HEI 2-151881 or TOKUKAI HEI 3-98057.

These references propose to automate start of the copy process, which is usually conducted by a depression of a copy start key. In using a copy machine, an operator usually begins with lifting up an original platen cover for opening an access to a contact glass for placing an original document on the contact glass. Then, the operator places the original platen cover down to hold the original document placed on the contact glass and depresses the copy start key for starting an image forming process. In the disclosed digital copying machine, the copying process starts automatically when both a placement of the original document on the contact glass and a movement of the original platen cover from an open state to a closed state are detected.

In this case, however, the problem arises that the copy process starts automatically right after setting the original document, in spite of a fact that, quite in general, an operator tends to set an original document first and then input an instruction, such as, for example, a change of a copy size, an input of a number of copies, or the like. A copy, therefore, is often wrongly made based on a previous operating instruction in the disclosed machine having such an automatic copy start function.

SUMMARY OF THE INVENTION

Accordingly, an object of the present invention is to provide a digital copying machine capable of performing a preliminary scanning function automatically without requiring depression of a copy start key, for shortening a copying time.

A further object of the present invention is to provide a digital copying machine which allows an operator to input, during a preliminary scanning, an instruction, such as, for example, a copy start, a change of a copy size, an input of a number of copies, or the like, for preventing copying based on a previously set instruction, regardless of an operator's intention.

It is yet another object of the present invention to provide a digital copying machine which automatically performs document size detection prior to starting a preliminary scanning process, also for shortening a copying time.

These and other objects are achieved according to the present invention by providing a novel image forming apparatus having a preliminary scanning function in two selective modes, an automatic preliminary scanning start mode and a manual preliminary scanning start mode. A selection of the automatic preliminary scanning start mode and the manual preliminary scanning start mode is made in a program menu of a preliminary scanning start mode selection with assistance of a display guidance message.

In the automatic preliminary scanning start mode, preliminary scanning starts automatically when selection of at least one of an automatic color selecting mode and a letter and photo mixed mode is detected, an original document is detected on the contact glass of the digital copying machine, and a movement of an original platen cover from an open state to a closed state is detected. On the other hand, in the manual preliminary scanning start mode, preliminary scanning starts when a copy start key is depressed.

In case no instructive input has been made during a preliminary scanning process in the automatic preliminary start mode, the digital copying machine enters a waiting state after a completion of the preliminary scanning process and waits for an operator's instruction, such as starting a copy, by depressing a copy start key. On the other hand, the digital copying machine automatically performs the copying scanning process following the preliminary scanning process in the manual preliminary scanning start mode.

The present invention further provides a function that an input of a copy start instruction, made during a preliminary scanning process in the automatic preliminary scanning start mode, is not ignored but is made effective. Thus, when the copy start key is depressed during the preliminary scanning process in the automatic preliminary scanning start mode, the depression is not ignored but is made effective and the digital copying machine automatically performs a copying scanning process following the preliminary scanning process, instead of entering a waiting state after a completion of the preliminary scanning process. On the other hand, when the copy start key is depressed during the preliminary scanning process in the manual preliminary scanning start mode, the depression of the copy start key is ignored.

The present invention further provides a function that an instructive input, during a preliminary scanning process both in the automatic preliminary scanning start mode and in the manual preliminary scanning start mode, is not ignored but is made effective. For example, when a numeric key for inputting a number of copies or an image effect key, such as, for example, a manual image density key for darkening an image, is depressed during the preliminary scanning process in both the automatic preliminary scanning start mode and the manual preliminary scanning start mode, the digital copying machine waits for a copy start key input, a detection of which makes inputted data effective, regardless of completion of the preliminary scanning process. Thus, an operator is free from observing the completion of the preliminary scanning process when entering instructions during such preliminary scanning process.

Further, the present invention provides document size detect sensors for detecting a size of an original document when the original document is placed on the contact glass so that the digital copying machine automatically performs, upon a detection of a movement from an open state to a closed state of the original platen cover, a function of document size detection together with a function of detecting an existence of an original document on the contact glass, prior to starting a preliminary scanning process.

Other objects and features of this invention will become understood from the following description with reference to the accompanying drawings.

BRIEF DESCRIPTION OF THE DRAWINGS

In describing preferred embodiments of the present invention illustrated in the drawings, specific terminology is employed for the sake of clarity. However, the invention is not intended to be limited to the specific terminology so selected and it is to be understood that each specific element includes all technical equivalents which operate in a similar manner.

A more complete appreciation of the invention and many of the attendant advantages thereof will be readily obtained as the same becomes better understood by reference to the following detailed description when considered in connection with the accompanying drawings, wherein:

FIG. 9 is a table showing a relationship between output data from three document size detect sensors and paper sizes;

DESCRIPTION OF THE PREFERRED EMBODIMENTS

Figure 1A:
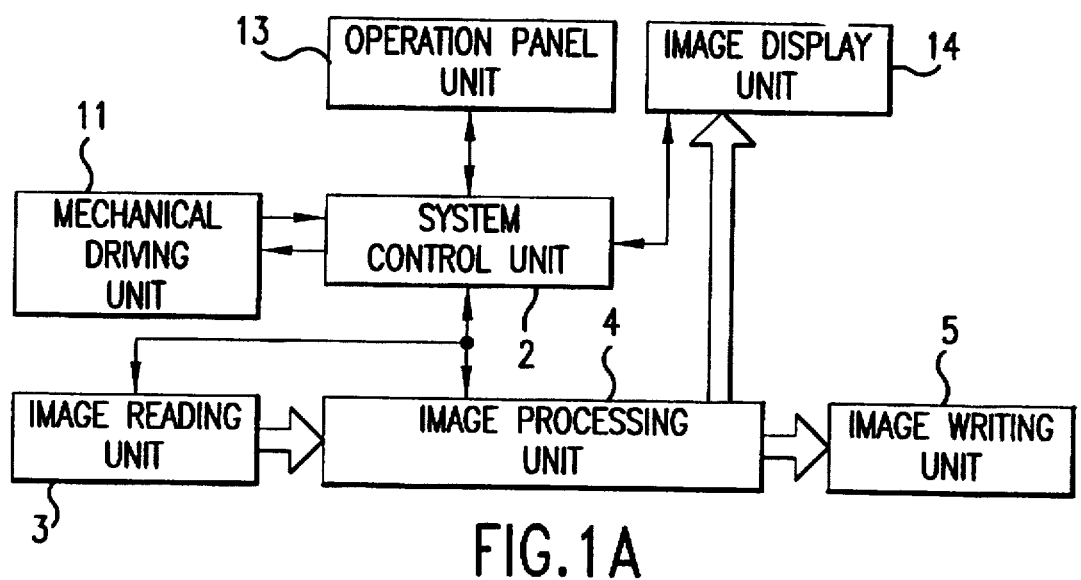
FIG. 1(a) is a schematic block diagram of a digital copying machine according to the present invention.
Figure 1B:
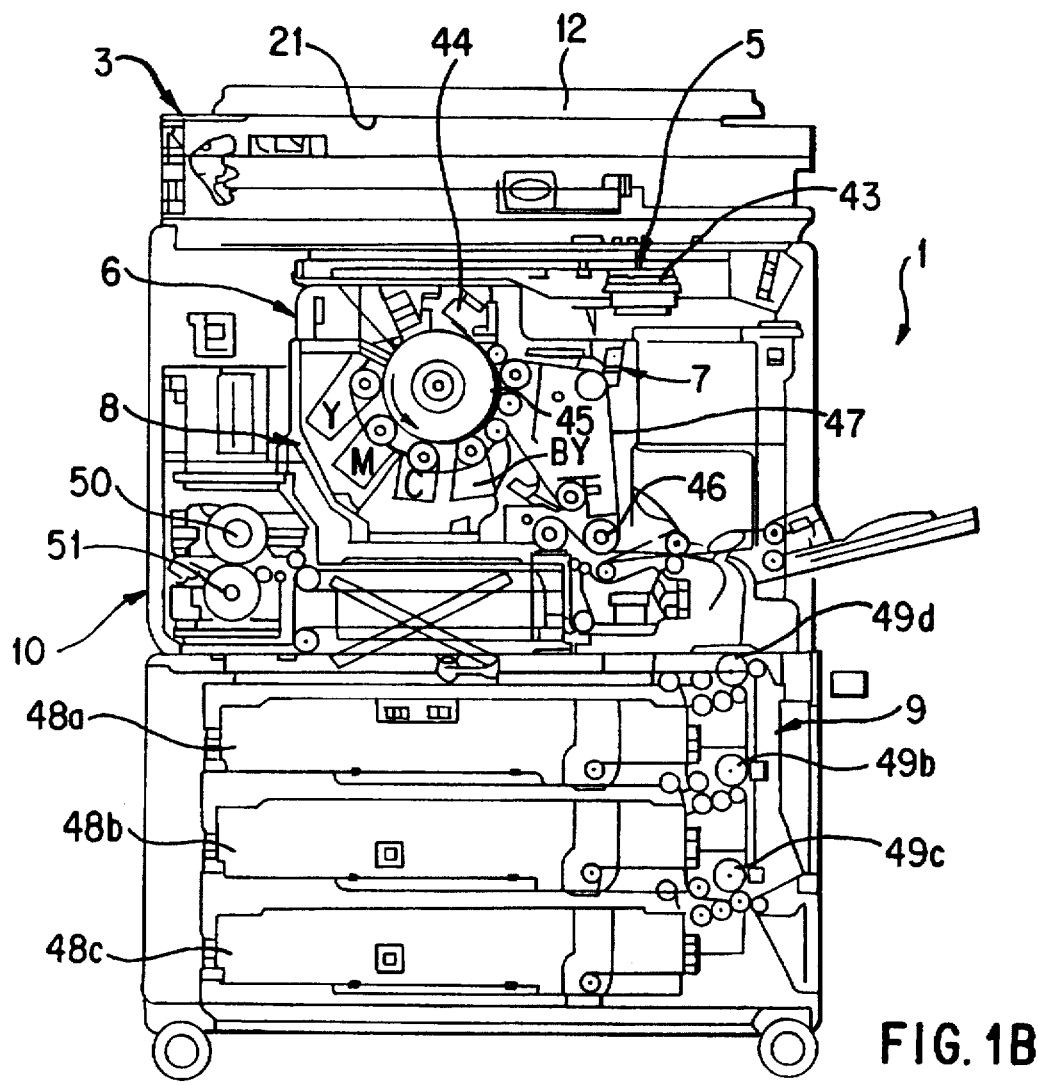
FIG. 1(b) is a schematic side view of a digital copying machine according to the present invention.

Referring now to the drawings, wherein like reference numerals designate identical or corresponding parts throughout the several views, and more particularly to FIGS. 1(a) and 1(b) thereof, there is illustrated a digital copying machine embodying the present invention. The digital copying machine 1 includes a system control unit 2, an image reading unit 3, an image processing unit 4, an image writing unit 5, a drum unit 6, an intermediate image transfer unit 7, a development unit 8, a paper feed unit 9, a fixing unit 10, a mechanical driving unit 11, an original platen cover 12, an operation panel unit 13, and an image display unit 14.

Figure 2A:
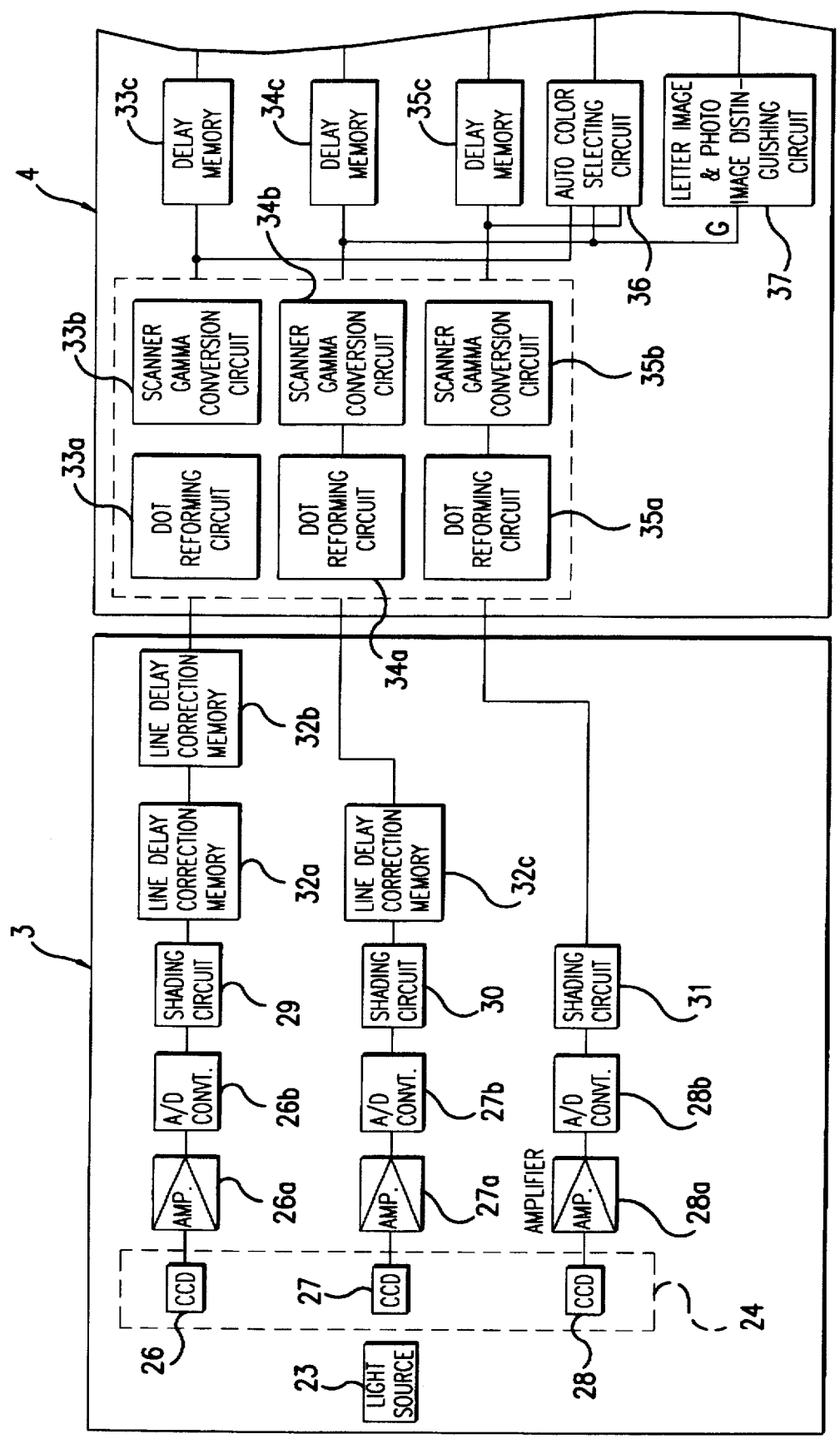
FIG. 2 is a functional block diagram of an image reading unit and an image process unit of the digital copying machine shown in FIG. 1.
Figure 2B:
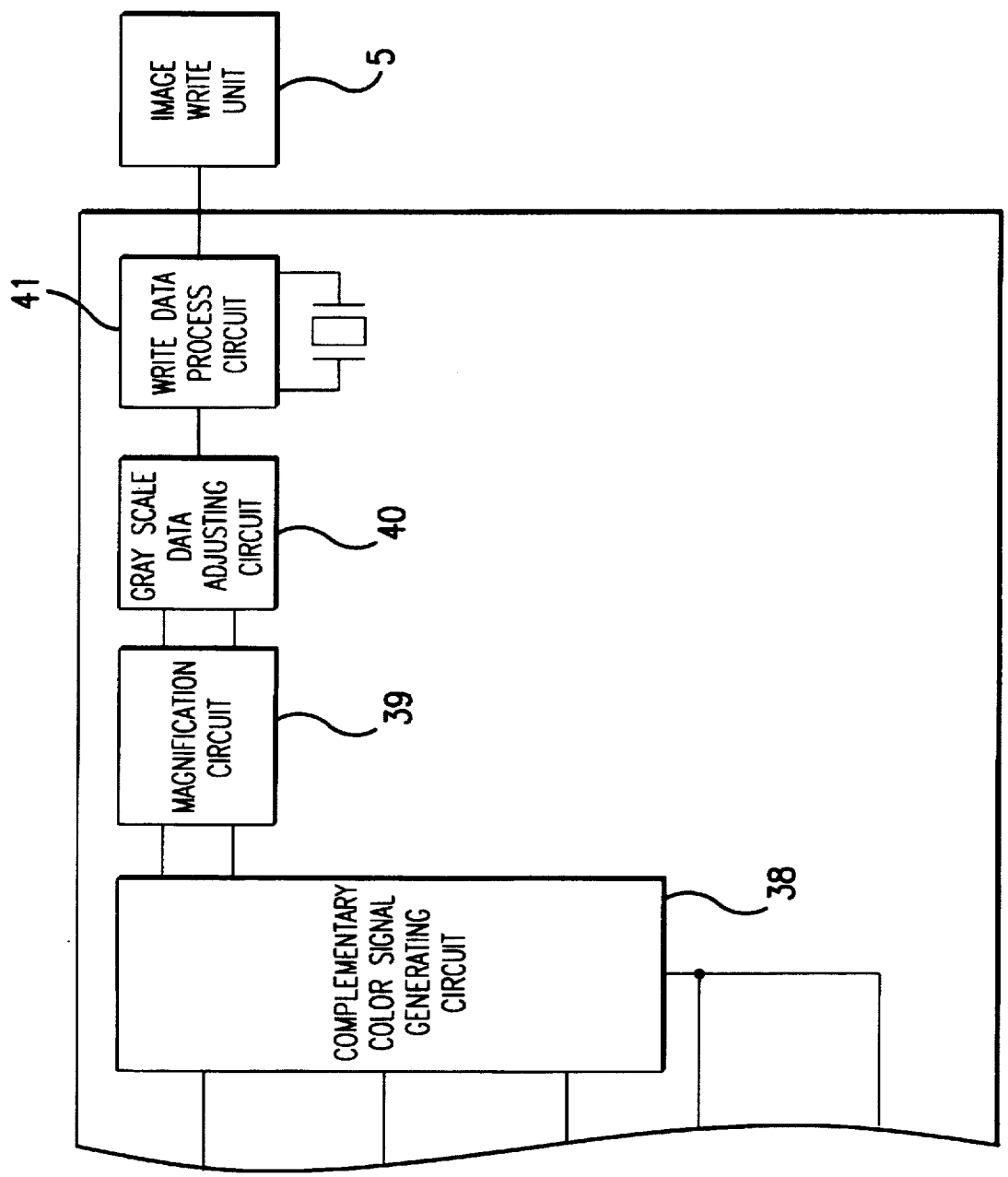

While an operation of the digital copying machine 1 is explained referring mainly to the schematic drawing in FIG. 1(a), a detailed data flow of a scanned image of an original document is explained referring mainly to a functional block diagram in FIG. 2.

The system control unit 2 includes a CPU(central processing unit), a RAM(random access memory), and a ROM (read only memory), and controls an entire operation of the digital copying machine 1.

The image reading unit 3 includes a CCD (charged coupled device) having three reading lines for color gray scale signals, representing a red, a green, and a blue color (hereinafter a red, a green, and a blue color are respectively abbreviated as R, G, and B), for reading an original document which is lightened by a light source, such as a halogen lamp. After scanning the surface of an original document and reading the image of the document, the image reading unit 3 sends the image data to the image processing unit 4 in response to an instruction from the system control unit 2.

Further, the image reading unit 3, including a CPU and a ROM storing a program, analyses the size of an original document set on a contact glass 21 and whether the original platen cover 12 is open or closed, and generates signals, representing results of the analysis performed by the CPU and ROM, to be sent to the system control unit 2.

The image processing unit 4, after receiving the image data from the image reading unit 3, recognizes the image data and processes the image data in accordance with the result of the recognition. More particularly, the image processing unit 4 determines if the image is a full color image or a black and white image in an automatic color selecting mode. Further, the image processing unit 4 sectionalizes the image by two image characteristics, a letter image or a photo image, in a letter and photo mixed mode. Both the automatic color selecting mode and the letter and photo mixed mode are well known in the industry as described in the discussion of the background of the invention.

The image writing unit 5 includes a laser diode 43 which outputs the laser beam light, which is modulated in accordance with an output signal from the image processing unit 4, to expose the drum unit 6.

The drum unit 6 includes a photoconductive drum 45, which rotates counterclockwise as seen from the front of the digital copying machine 1 so as to move its surface to be uniformly charged by a main charger 44. Then, as the photoconductive drum 45 is exposed to the modulated laser beam light generated by the laser diode 43, an electrostatic latent image is formed on the surface of the photoconductive drum 45 in accordance with the image of the original document.

The development unit 8 includes four development devices, Y, M, C, and Bk, which respectively correspond to yellow, magenta, cyan, and black colors and are positioned around the photoconductive drum 45. In the full color mode, four scannings of the original document are performed for developing a full color image, and a respective color toner is activated for developing a respective single color image after each scanning process. The four color toners, yellow, magenta, cyan, and black are activated, one by one in that order, in each development cycle. When the electrostatic latent image formed on the surface of the photoconductive drum 45 makes the first passing through the four development devices, Y, M, C, and Bk in the development unit 8, particles of the yellow color toners which are contained in the development device Y are attracted onto the electrostatic latent image and form a yellow colored visible toner image on the surface of the photoconductive drum 45. The intermediate image transfer unit 7 includes a seamless belt 47 which has a position in contact with the surface of the photoconductive drum 45, and the toner particles forming the image on the surface of the photoconductive drum 45 are transferred onto the surface of the seamless belt 47. The same toner transfer operation is then successively performed for the magenta, the cyan, and the black colors respectively, in that order so as to form finally a full colored image (a four colored image) on the surface of the seamless belt 47. After the full colored image is formed on the seamless belt 47, the belt 47 begins at a prescribed time to transfer the full colored image on the seamless belt 47 to a recording paper fed by the paper feed unit 9.

The paper feed unit 9 includes paper cassettes 48a–48c containing recording papers of different sizes, such as a standard A5, A4, B5, and so forth, and paper feed rollers 49a–49c which feed the recording paper contained in the paper cassettes 48a–48c to a transfer roller 46 in synchronism with the timing of operation of the seamless belt 47.

The fixing unit 10 includes a fixing roller 50 and a pressure roller 51 which both are heated up to a prescribed temperature. The recording paper on which the toner image has been transferred passes through the fixing unit 10 and is then ejected from the digital copying machine after the toner image is affixed onto the paper by the heat and pressure applied by the fixing roller 50 and the pressure roller 51.

The mechanical driving unit 11 includes motors and gears for driving the above-mentioned mechanical devices, such as the photoconductor drum 45, the development devices Y, M, C, and Bk, the paper feed rollers 49a–49c, and so forth, and the detailed description thereof is omitted.

In the present embodiment, the image writing unit 5, the drum unit 6, the intermediate image transfer unit 7, the development unit 8, and the fixing unit 10 form means for forming an image onto a paper in accordance with an image of an original document.

The original platen cover 12 is provided on top of the image reading unit 3 for holding an original document on the contact glass 21.

The operation panel unit 13 is provided preferably in front and on top of the image reading unit 3 for receiving an operator's instruction, in which the image display unit 14 described later is incorporated.

Next, flow of the image data read by the image reading unit 3 is explained with respect to FIG. 2.

The image reading unit 3 includes a light source 23, a CCD 24 including three built-in reading elements 26–28 that correspond to R, G, and B contained in the image of an original document which is radiated by the light source 23, three amplifiers 26a–28a that correspondingly amplify each color data read by the CCD 24 in FIG. 1, three A/D(analog to digital) converters 26b–28b that convert the analog data signals amplified by the amplifiers 26a–28a to digital data signals, shading circuits 29–31 that rectify unevenness of luminous intensity among three color gray scale data and unevenness of electrical sensitivity between internal terminals arranged inside of the CCD 24 after receiving the color gray scale data signals from the A/D converters 26b–28b, and line delay correction memories 32a–32c that compensate a time delay among the three reading lines for the color gray scale signals, which occurs in the CCD 24.

In the present embodiment, the image reading unit 3 forms means for optically scanning an image of an original document placed at a designated position on a contact glass of the digital copying machine.

The image processing unit 4 in FIG. 1 includes the following circuits for recognizing and processing the image data of the original document. Dot reforming circuits 33a–35a reform a dot shape in accordance with a selected size by a copy size magnification instruction. Scanner gamma conversion circuits 33b–35b convert the image data outputted from the image reading unit 3 according to a scanner gamma curve. Delay memories 33c–35c hold output signals from the scanner gamma conversion circuits 33b–35b in order to synchronize the output signals from circuits 33b–35b with the output signals from a letter and photo image distinguishing circuit 37 which processes an image data by a unit of three-by-three dots. An automatic color selecting circuit 36 judges if the image of an original document is a color image or a black and white image based on the signals outputted from the scanner gamma conversion circuits 33b–35b. The letter and photo image distinguishing circuit 37 distinguishes a letter image from a photo image based on the signal G(green) representing green color, since the green color is the most stable color outputted from the scanner gamma conversion circuits 33b–35b. A complementary color signal generating circuit 38 converts the signals of the gray scale data, which correspond to R, G, and B output with a prescribed time delay from the delay memories 33c–35c, to the signals of the gray scale data, corresponding to respectively complementary colors, yellow, magenta, cyan, and black. A magnification circuit 39 magnifies the signals of the gray scale data, corresponding to respective colors, yellow, magenta, cyan, and black, in a main scanning direction, after the data conversion by the complementary color signal generating circuit 38. A gray scale data adjusting circuit 40 adjusts the gray scale data, corresponding to respective colors, yellow, magenta, cyan, and black, outputted from the magnification circuit 39, to respective new gray scale data which are suitable as write data to be used in the following circuit for a write data processing. A write data process circuit 41, which is connected to the following image write unit 5, makes one image data by mixing the new gray scale data of yellow, magenta, cyan, and black, which are outputted from the gray scale data adjusting circuit 40.

Figure 3A:
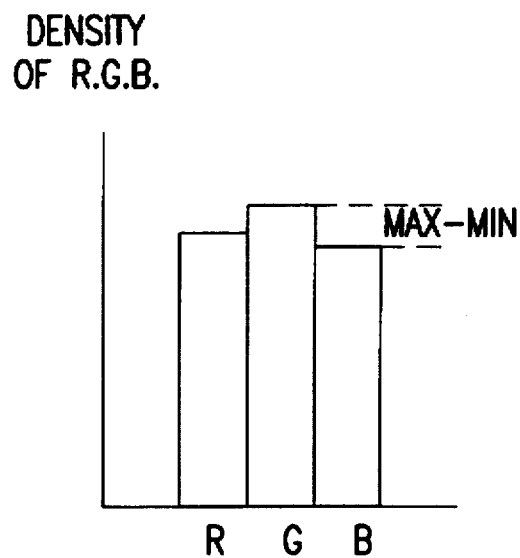
FIG. 3(a) is a graph showing a relationship among gray scale data of three color elements, red, green, and blue.

FIG. 3(a) illustrates an example of gray scale data corresponding to R, G, and B contained in one picture element which is made of one dot, as being inputted into the automatic color selecting circuit 36 in the image processing unit 4. The automatic color selecting circuit 36 monitors the gray scale data of every picture element and determines that a picture element is a non-color picture or a black and white picture, when a gap between a maximum value and a minimum value among the gray scale data of R, G, and B in the picture element is measured as smaller than a prescribed value. The automatic color selecting circuit 36 also checks a way in which a color picture appears, and determines that an image is a full colored image when continuity and frequency of appearance of color pictures elements exceeding a prescribed value are measured in one scanning process. The system control unit 2, which receives a feedback signal from the automatic color selecting circuit 36, determines to proceed with the image forming process in a black and white mode or in a full color mode, and instructs the drum unit 6 and the development unit 8 accordingly.

Figure 3B:
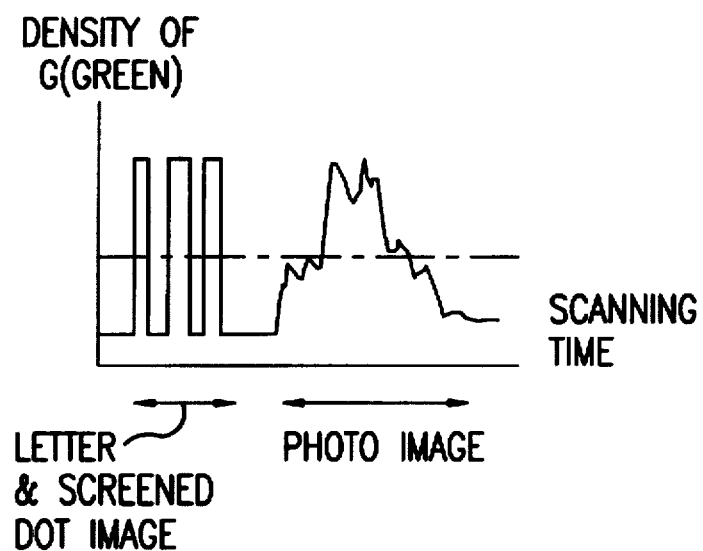
FIG. 3(b) is a graph showing a characteristic of gray scale data representing a letter image, screened dot image, and a photo image.

FIG. 3(b) illustrates another example of gray scale data of R, G, and B, as being measured by the letter and photo image distinguishing circuit 37. The letter and photo image distinguishing circuit 37 distinguishes letter images and screened dot images from photo images by examining a black and white contrast at an edge portion of the gray scale data of every picture element, and further distinguishes the screened dot images from the letter images by a pattern matching method in which various mesh patterns fit to the screened dot image are used. The letter and photo image distinguishing circuit 37 further checks the gray scale data of an image, judged as a screened dot image, by a unit of three-by-three picture elements and determines that the image, formed by the same three-by-three picture element, is made of screened dots when the gray scale value of a picture element which is positioned at a center in a three-by-three picture element unit is far below or above than value of other eight surrounding elements. The letter and photo image distinguishing circuit 37 determines that all remaining images other than letter images are recognized as photo images. Accordingly, a write data process made by the write data process circuit 41 is adjusted with the most appropriate parameters for letter images and photo images.

In the present embodiment, the system control unit 2 and the image processing unit 4 form means for executing an image data recognition and processing, as described above.

Figure 4A:
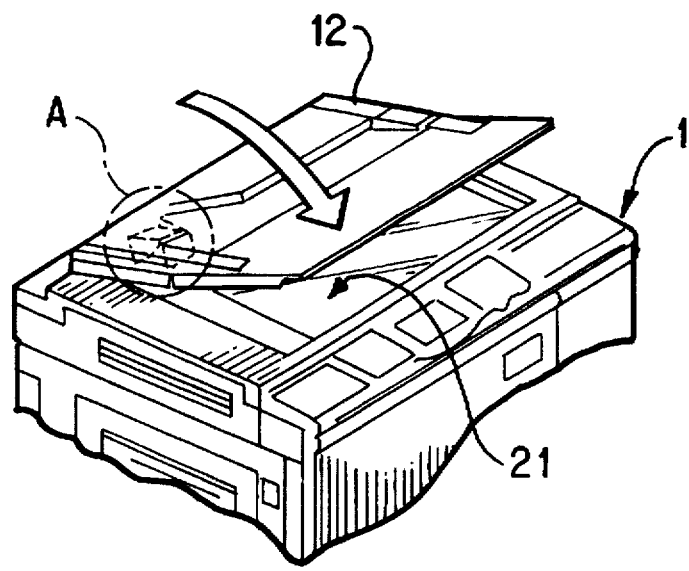
FIG. 4(a) is a perspective illustration showing a schematic arrangement of an original platen cover and a cover detect tab.
Figure 4B:
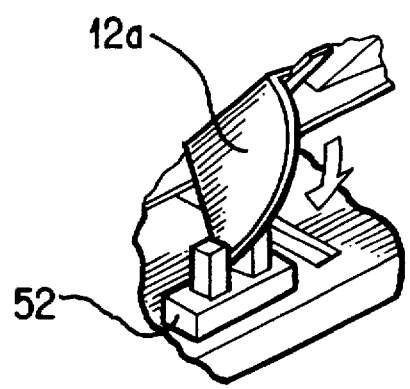
FIG. 4(b) is a perspective illustration showing a schematic arrangement of a cover detect sensor and a cover detect tab illustrated in FIG. 4(a)

Next, an operation of an original platen cover detection is explained with respect to FIGS. 4(a) and 4(b). The original platen cover 12 is provided on the upper surface of the digital copying machine 1 with a pivot for opening and closing at the connection with the contact glass 21, as shown in the FIG. 4(a). On the back side of the original platen cover 12, a cover detect tab 12a is provided as shown in FIG. 4(b), which is a magnified illustration of the part A indicated by the arrow in FIG. 4(a).

A cover detect sensor 52, provided at the upper surface of the digital copying machine 1 and including a photo sensor, outputs a detection signal to the CPU of the image reading unit 3. When the original platen cover 12 is closed, the cover detect tab 12a comes closer to the cover detect sensor 52, and blocks light flow between a light source and a light sensor of the cover detect sensor 52. When the original platen cover 12 is opened, the cover detect tab 12a is removed from the cover detect sensor 52 and the light begins to flow between the light source and a light sensor. The CPU of the image reading unit 3 judges if the original platen cover 12 is open or closed based on the detection signal from the cover detect sensor 52, and outputs a feedback signal indicative of the judgment to the system control unit 2.

In the present embodiment, the original platen cover 12 forms means for holding an original document placed at a designated position of a contact glass of the digital copying machine and the cover detect sensor 52 forms means for detecting an open state and a closed state of the original platen cover 12.

Figure 5:
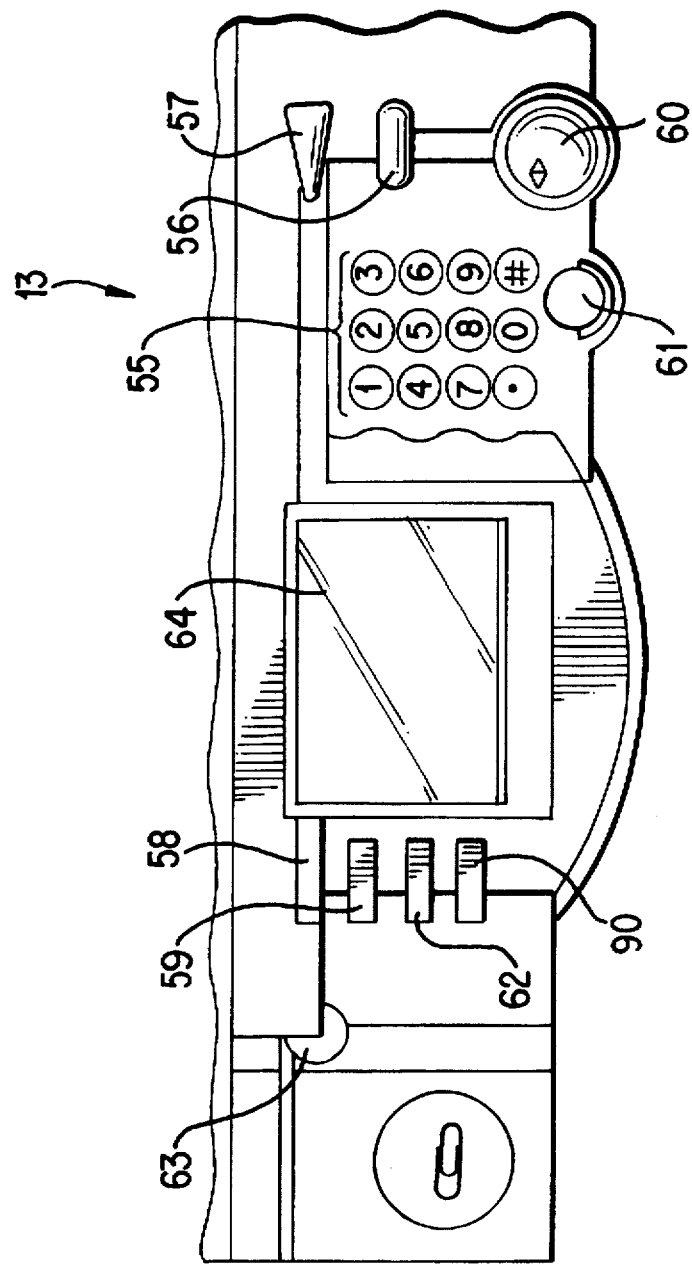
FIG. 5 is an illustration showing an arrangement of various keys and indicators on an operation panel unit of the digital copying machine.

Next, functions of various keys on the operation panel unit 13 are explained with respect to FIG. 5. A ten-key pad 55 is provided for inputting a numeric specifying, for example, a number of copies. An initializing key 56 is provided for initializing to initial mode conditions and for shifting to an energy saving mode by a continuous depression thereof for a time longer than a prescribed period of time. An interrupt key 57 is provided for interrupting a copying job which is then in progress. An image characteristic adjustment key 58 is provided for adjusting an image characteristic, for example, a color contrast of an image. A program key 59 is provided for registering a mode program, which an operator frequently uses, so as to make a mode setting easy. A copy start key 60 is provided for instructing to start copying. A clear and stop key 61 is provided for erasing a numeric number inputted and for stopping a copying job in action. An area editing key 62 is provided for editing an image using a display on an image display unit 14 which is described later. A brightness adjuster 63 is provided for adjusting the brightness of an LCD (liquid crystal display) panel. A touch-sensing-panel key pad 64 including touch-sensing keys positioned on an LCD (liquid crystal display) panel 65 is provided so that an operator's touch on the touch-sensing-panel key pad is recognized as a key depression of a corresponding key displayed on the LCD (liquid crystal display) panel.

Figure 6:
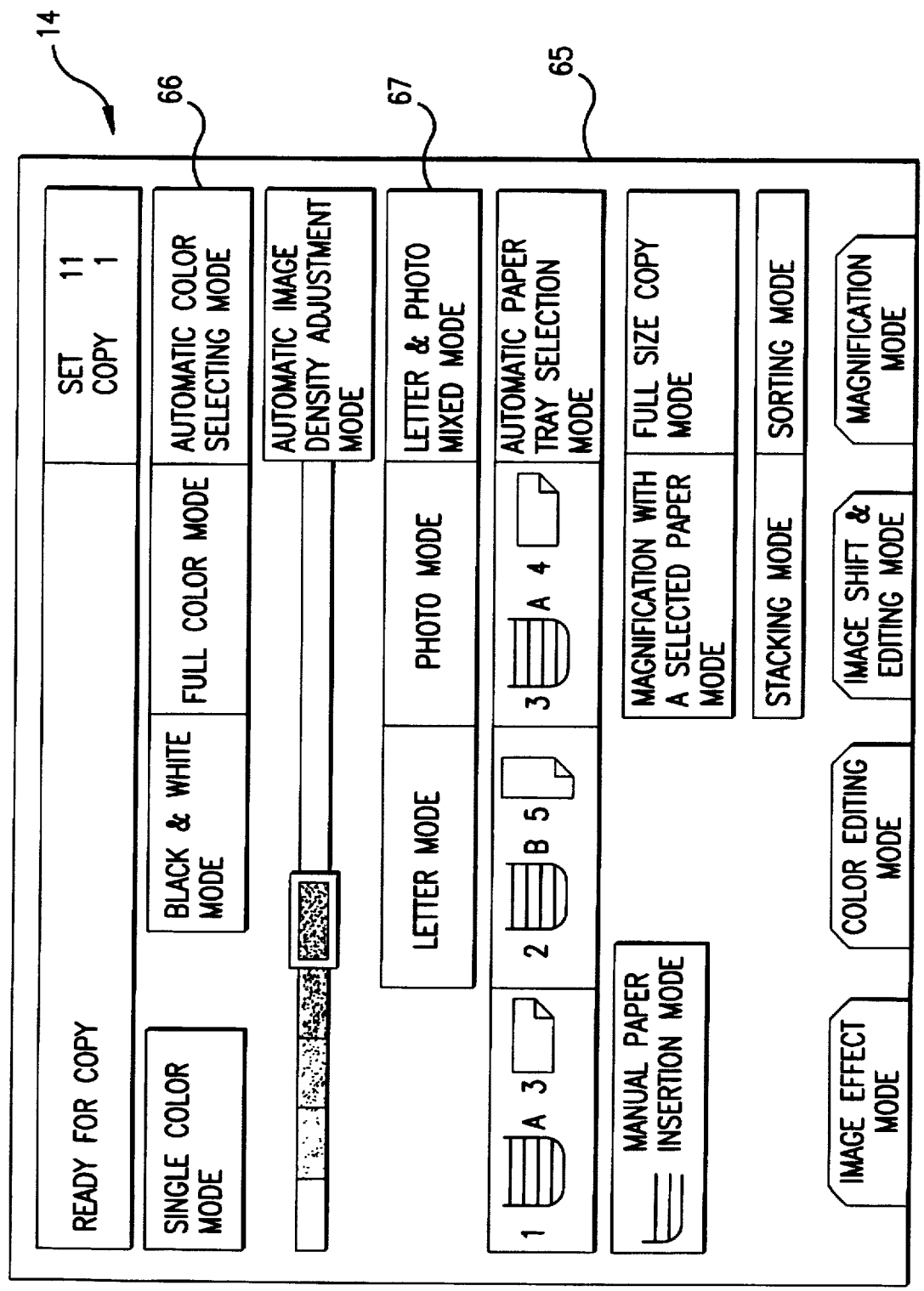
FIG. 6 is an illustration showing an example of a display page on an LCD(liquid crystal display) panel.

Next, various indications on the image display unit 14 are explained with respect to FIG. 6. The image display unit 14 includes an LCD (liquid crystal display) panel 65 which is provided underneath the touch-sensing-panel key pad 64 and displays various messages and touch-sensing keys as described below. The LCD (liquid crystal display) panel 65 displays a message indicating that the apparatus is ready for copying, the number of copies being set, the number of copies being made, touch-sensing keys for designating an automatic color selecting mode, a full color mode, a black and white mode, a single color mode, a letter and photo mixed mode, a photo mode, a letter mode, an automatic image density adjustment mode, an automatic paper tray selection mode, a paper tray 1, a paper tray 2, a paper tray 3, a manual paper insertion mode, a full size copy mode, a magnification with a selected paper size mode, a sorting mode, a stacking mode, and a touch-sensing slidable bar for a manual image density adjustment. The LCD (liquid crystal display) panel 65 also displays touch-sensing selective sub-display keys for adjusting an image effect mode, such as a mirror print, a color editing mode such as a color alteration, an image shift and editing mode, such as an image shift for shifting an image to the center of a paper or to one side of the paper for providing a book binding margin at the other side of the paper, and a magnification mode for magnifying a size of an image. And, the touch-sensing-panel key pad 64 has a transparent panel so that all keys displayed on the LCD (liquid crystal display) panel 65 can be seen in the same form and size as displayed on the LCD panel 65 through the touch-sensing panel key pad 64. When a message key, such as the automatic color selecting mode 66 or the letter and photo mixed mode 67 is selected through the touch-sensing-panel key pad 64, for example, the information is sent to the system control unit 2, which then outputs a signal to the image processing unit 4 for executing the image processing operation in an appropriate mode in accordance with the selected mode.

In the present embodiment, the operation panel unit 13 forms means for selecting at least one of a process for distinguishing between a color image and a non-color image and a process for distinguishing among a letter image, a screened dot image and a photo image.

Figure 7:
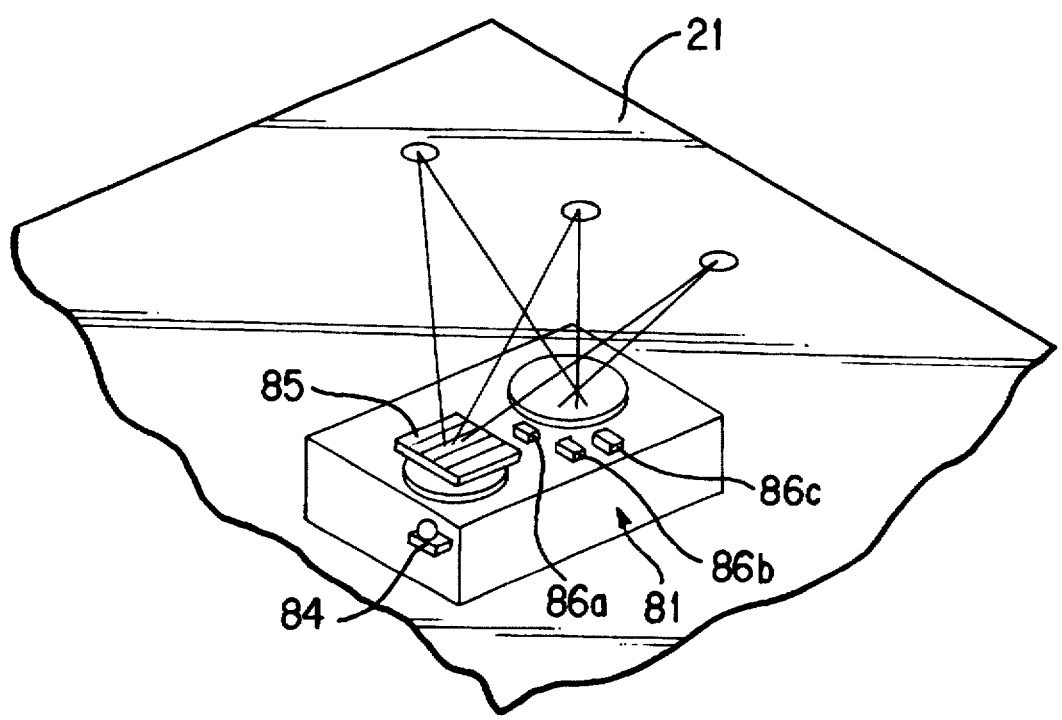
FIG. 7 is a perspective illustration showing an arrangement of a document size detect sensor.
Figure 8A:
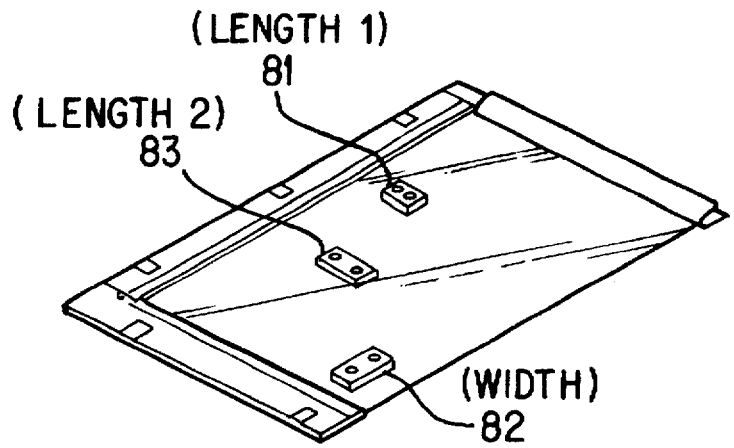
FIG. 8(a) is a perspective illustration showing a physical positioning of three document size detect sensors.
Figure 8B:
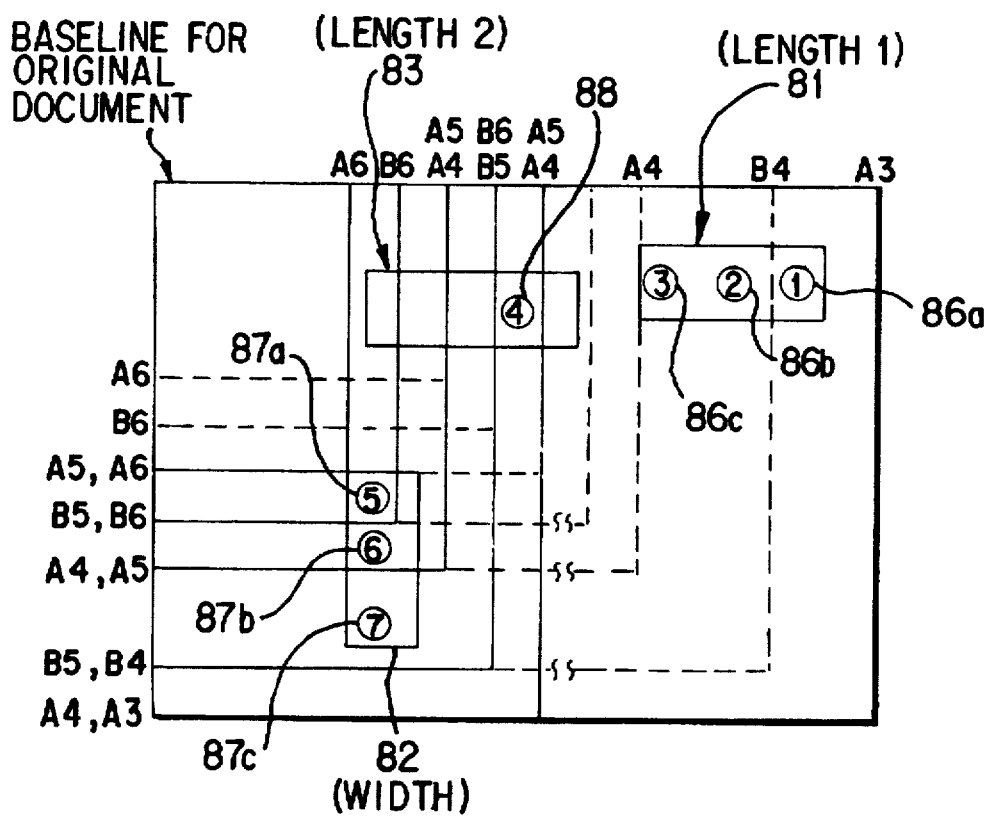
FIG. 8(b) is an illustration showing a relationship between positions of an original document and three document size detect sensors.

Next, an operation of a document size detection is explained with respect to FIGS. 7–9. Underneath the contact glass 21, as shown in FIG. 8(a), original document size detect sensors 81–83 are provided and positioned respectively at the designated places for detecting existence of an original document placed on the contact glass 21. As shown in FIG. 8(b), the original document size detect sensors 81 and 83 are provided for detecting a longitudinal extension and the original document size detect sensor 82 for lateral extension, covering a wide variation of paper sizes.

Firstly, among three original document size detect sensors 81–83, an operation of the original document size detect sensor 81 is explained, as an example, with respect to FIG. 7. The original document size detect sensor 81 includes an LED (light emitting diode) 84 as a light source device, a grating device 85 for separating a light beam from the LED (light emitting diode) 84 to three light beams, and light receiving devices 86a–86c for detecting the above-mentioned three light beams, which have been reflected from the surface of the original document placed on the contact glass 21, and then outputting a signal of such detection to the CPU of the image reading unit 3. The original document size detect sensor 82 has the same feature of the original document size detect sensor 81, including a grating device to separate a light beam from an LED (light emitting diode), which is not illustrated in the figure, to three light beams, and also including three light receiving devices 87a–87c for detecting the above-mentioned three light beams which have been reflected from the original document placed on the contact glass 21 and for then outputting a signal of such detection to the CPU of the image reading unit 3. The original document size detect sensor 83 includes a light receiving device 88 for detecting a light beam generated by an LED (light emitting diode), which is not illustrated in the figure, after the light beam has been reflected from the original document placed on the contact glass 21, and for outputting a signal of such detection to the CPU of the image reading unit 3.

In the present embodiment, the original document size detect sensors 81–83 form means for detecting an existence of an original document placed at a designated position on a contact glass of the digital copying machine.

The light receiving devices 86a–86c, 87a–87c, and 88 of the three detect sensors are positioned in each designated place, and the CPU of the image read unit 3 determines a size of the original document placed on the contact glass 21 in accordance with the combination of the output signals from the above-mentioned three detect sensors as shown in a cross reference table in FIG. 9. As an example, the CPU determines that an original document placed on the contact glass 21 is a standard A4 size in a portrait position when the detect information signals are outputted from the light receiving devices 87a, 87b, 87c and 88. In FIG. 9, a black circle mark indicates detection of an original document and a cross mark indicates non-detection of an original document.

After determining the document size, the CPU of the image reading unit 3 outputs a feedback signal to the system control unit 2 informing of the document size.

The system control unit 2, on the other hand, instructs the image reading unit 3 to execute the preliminary reading function, when the system control unit 2 receives a signal from the touch-sensing-panel key pad 64 indicating that at least one of the automatic color selecting mode 66 and the letter and photo mixed mode 67 is set and other signals from the CPU of the image reading unit 3 indicate both that the original platen cover 12 is closed and that an original document is placed on the contact glass 21.

In the present embodiment, the system control unit 2 forms means for controlling the optically scanning device.

Figure 10A:
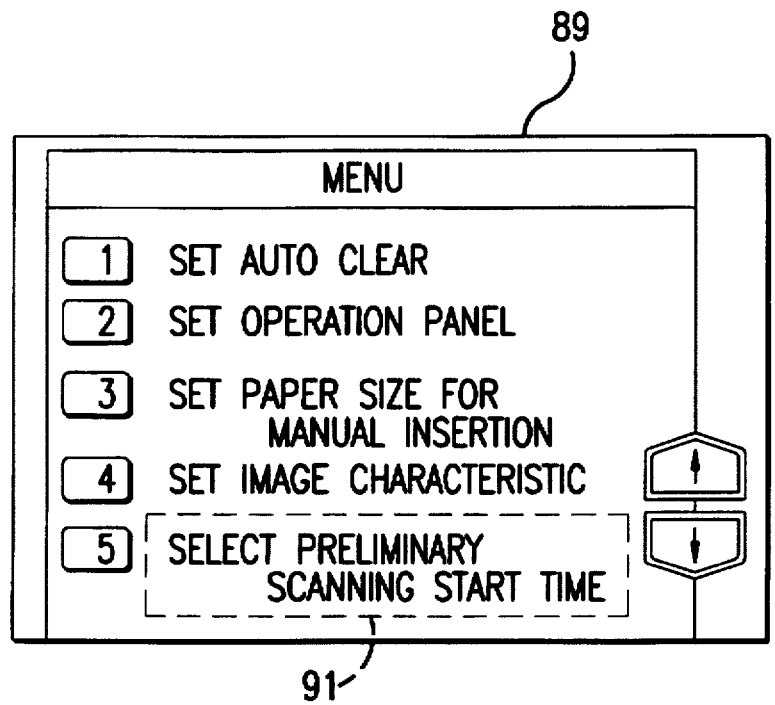
FIG. 10(a) is an illustration showing an example of a display page on an LCD panel indicating mode setting messages and corresponding touch-sensing keys.
Figure 10B:
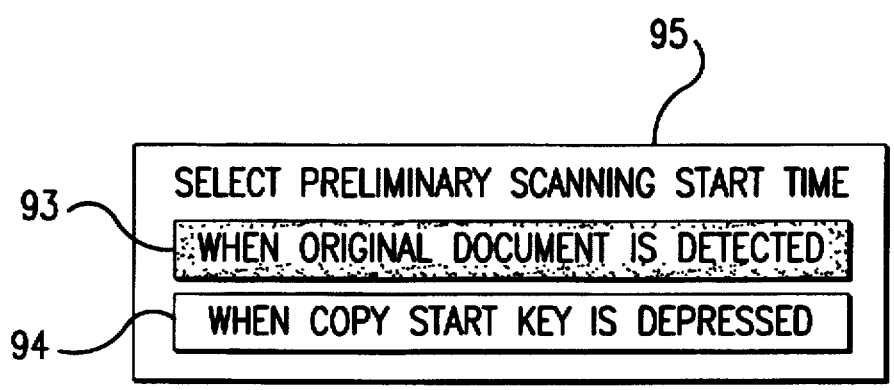
FIG. 10(b) is an illustration showing another example of a display page on the LCD panel indicating other message keys.

Next, a function of an option key 90 in FIG. 5 on the operation panel unit 13 is explained with respect to FIGS. 10(a) and 10(b). When the option key 90 on the operation panel unit 13 is depressed, the LCD (liquid crystal display) panel 65 changes the content of the displayed page from the current page to a display page 89 indicating various mode setting messages (menu), together with corresponding touch-sensing keys, as shown in FIG. 10(a), such as a set auto clear, a set operation panel, a set paper size for manual insertion, a set image characteristics, and, a select preliminary scanning start time. Then, a depression of a touch-sensing key, indicated as 5 on the touch-sensing-panel 64, for example, which corresponds to a message of a select preliminary scanning start time 91, changes the display page on the LCD (liquid crystal display) panel 65 to a display page 95 as shown in FIG. 10(b). The display page 95 is provided for selecting a preliminary scanning start time and shows a message requesting to select a preliminary scanning start time, as shown in FIG. 10(b), and further displays touch-sensing message keys for designating a preliminary scanning start time, such as "when original document is detected" 93, which is for designating the preliminary scanning to start when detecting the existence of the original document on the contact glass 21, and such as "when copy start key is depressed" 94, which is for designating the preliminary scanning to start at a depression of the a start key 60. When one of the message keys is depressed, the depressed message turns to white on the display and one more depression on the white message activates the mode selected.

In the present embodiment, the operation panel 13 forms means for designating at least one of a time when detecting a existence of an original document and a time when receiving an instruction of a copy start.

Figure 11:
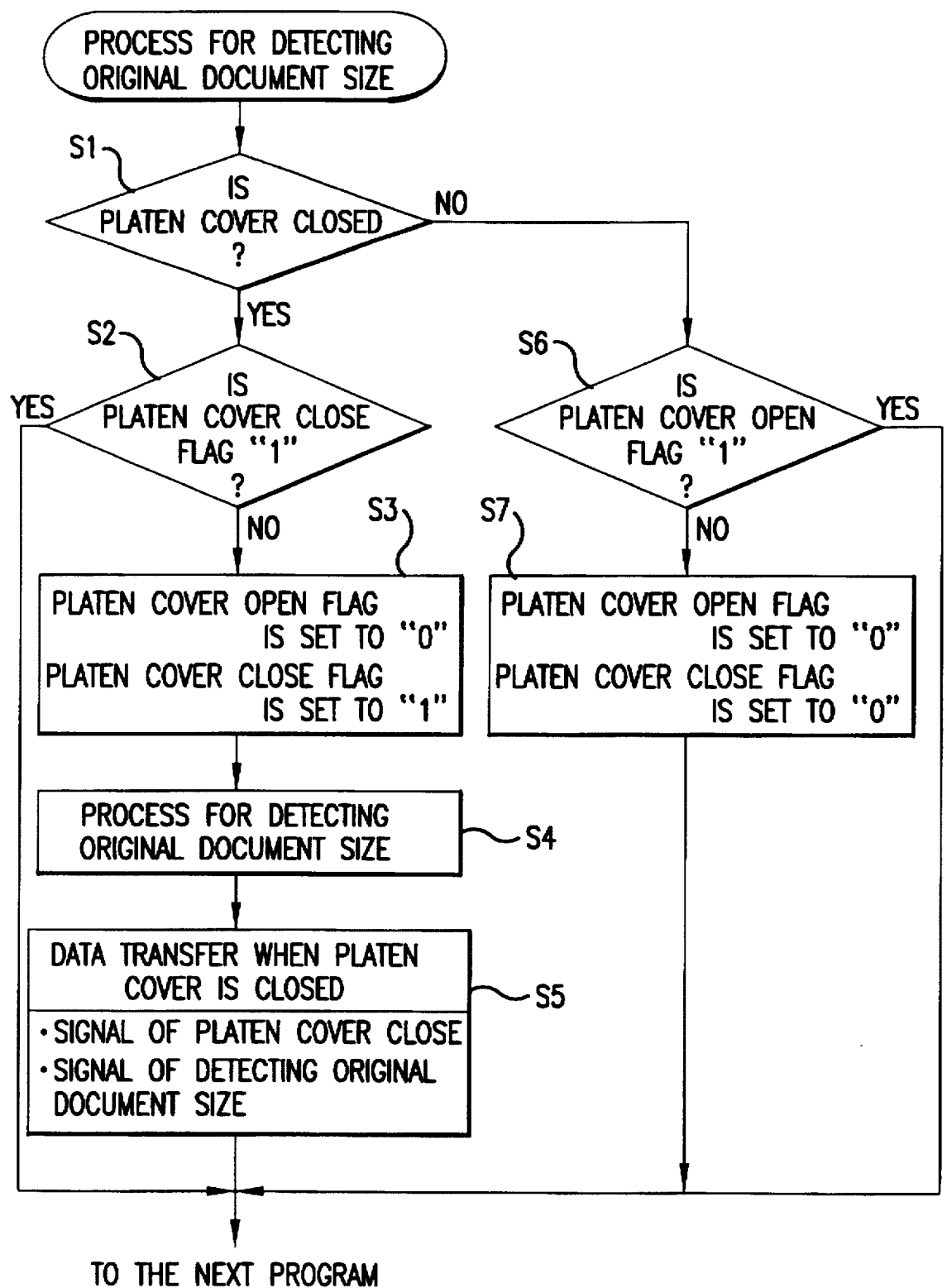
FIG. 11 is a flowchart illustrating steps performed during document size detection.

Next, operation of document size detection is explained with respect to the flowchart in FIG. 11. The document size detection by the image reading unit 3 is performed under control of a software program stored in a ROM located in the image reading unit 3.

Firstly, step S1 judges whether or not the original platen cover 12 is in a closed state. The judgment is executed based on the output signals from the cover detect sensor 52. When the cover detect sensor 52 detects the cover detect tab 12a, the original platen cover 12 is in a closed state. When judging the original platen cover 12 is in the closed state, the program goes to the following step S2, otherwise to step S6 described later.

Next, step S2 judges whether or not a cover close flag is set to 1. The cover close flag is triggered to become 1 when the state of the original platen cover 12 changes from an open state to a closed state. So, when the original platen cover 12 is in a closed state and, at the same time, the cover close flag is set to 1, the original platen cover 12 is recognized as being already in a closed state and the program jumps to another step. On the other hand, when the original platen cover 12 is in the closed state and the cover close flag is set to 0, the original platen cover 12 is recognized as just turning into the closed state, and the process goes to the following step S3.

Next, step S3 initializes flags for the next judgment on the original platen cover 12. In step S3, the cover close flag is reset to 1 and the cover open flag is reset to 0, and the program goes to step S4.

Next, step S4 makes a judgment as to original document size. The size of the original document is determined based on the feedback information from the light receiving devices 86a–86c, 87a–87c, and 88 of the original document size detect sensors 81–83, as shown in FIG. 9. Then, the program goes to the final step S5.

Step S5 sends to the system control unit 2 feedback information on the judgment result on the document size and the detected information that the original platen cover 12 is in a closed state, and then the program goes to other process steps.

When the original platen cover 12 is judged to be in the open state, the program goes to step S6.

Step S6 judges whether or not the cover open flag is 1 or not. The cover open flag is triggered to become 1 when the state of the original platen cover 12 changes from a closed state to an open state. The original platen cover 12 is judged as being already in the open state when the original platen cover 12 is in the open state and the cover open flag is set to 1, and the program jumps to other process steps. But, when the original platen cover 12 is in the open state and the cover open flag is set to 0, the original platen cover 12 is judged as just turning into the open state, and the program goes to the following step S7.

Step S7 presets the cover open flag to 1 and the cover close flag to 0 to prepare for the next judgment.

Figure 12:
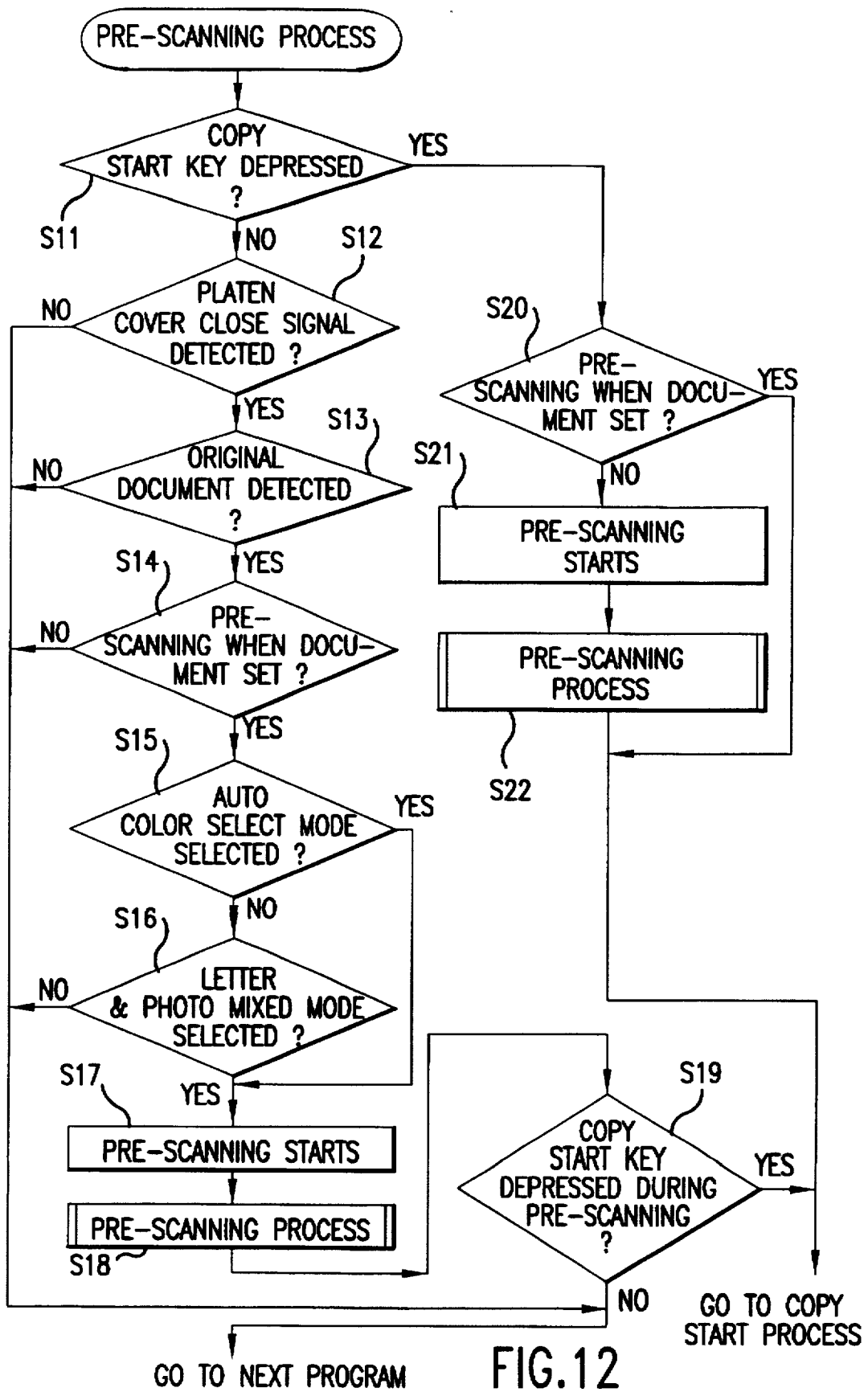
FIG. 12 is a flowchart illustrating steps performed during preliminary scanning.

Next, an operation of the preliminary scanning implemented in the system control unit 2 is explained with respect to the flowchart in FIG. 12.

Firstly, step S13 judges whether or not the copy start key 60 is depressed, and when no depression is detected, further judgment by step S12 is made.

Next, step S12 judges whether or not the system control unit 2 receives the cover close signal outputted from the CPU of the image reading unit 3, and when no cover close signal is received, the program goes to other process steps. In step S12, when the judgment is made that the cover close signal has been received, further judgment by step S13 is made.

Next, step S13 judges if the system control unit 2 receives the signal indicating the existence of the original document from the CPU of the image reading unit 3, and when no signal is received, the program goes to other process steps. But, when a judgment is made that the signal is received in step S13, the system control unit 2 judges that the existence is detected, and the program goes to step S14.

Next, step S14 judges whether or not the preliminary scanning start time is selected when the original document is detected 93 as shown in FIG. 10(b). This judgment is made by detecting if the message key 93 ("when original document is detected") presented in the display page 95 on the LCD (liquid crystal display) panel 65 is depressed or not. When no depression is detected, a judgment is made that the message key 93, ("when original document is detected"), has not been selected, and the program goes to other process steps. But, in case of detecting a depression of the message key 93, the program proceeds to step S15.

Next, step S15 judges whether or not the automatic color selecting mode is set. Selection of the automatic color selecting mode is detected by monitoring the depression of the touch-sensing "automatic color selecting mode" key 66, indicated in FIG. 6, and when the depression of the key 66 is detected, the program jumps to step S17 skipping step S16. When the depression of the key 66, is not detected, further judgment is made as to whether or not the letter and photo mixed mode is set.

Next, in step S16, whether or not the letter and photo mixed mode is selected is judged by monitoring the depression of the touch-sensing "letter and photo mixed mode" key 67, which is presented in FIG. 6. When a depression of the key 67 is not detected, the program goes to other process steps, but when a depression of the key 67 is detected, the program goes to the following steps S17 and S18 where the preliminary scanning process is commenced and executed.

In the process of preliminary scanning, as described before, the original document is radiated by moving the light source 23 and the mirror unit for a distance corresponding to the longitudinal length of the original document, and the image of the original document radiated by the light source 23 is read through the CCD 24. The image data read by the CCD 24 are amplified through the amplifiers 26a–28a, and after being converted from analog data to digital data through the A/D (analog to digital) converters 26b–28b, the image data are sent to the image processing unit 4 through the shading circuits 29–31 and the line delay correction memories 32a–32c.

In step S15, when the selection of the "automatic color selecting mode" key 66 is detected, the image data sent to the image processing unit 4 reaches the automatic color selecting circuit 36 after passing through the dot reforming circuits 33a–35a and the scanner gamma conversion circuits 33b–35c.

When a gap between a maximum value and a minimum value among gray scale data of R, G, and B in a picture element is smaller than a prescribed value, the automatic color selecting circuit 36 judges that the picture element is a non-color picture element and is a black and white picture element. Then, when continuity and frequency of appearance of a color picture element, measured on all picture elements generated in one scanning process, exceeds a prescribed value, the automatic color selecting circuit 36 further judges that the scanned image is a full color image. The system control unit 2 receives feedback signals from the automatic color selecting circuit 36, and consequently determines a mode for forming the image, either in the black and white mode or in the full color mode, and instructs the development unit 8, the drum unit 6, and so forth, so as to operate in the determined mode. As an example, when the black and white mode is selected, only the development device Bk is activated for forming the image, but when a full color mode is selected, the four development devices, Y, M, C, and Bk are activated for forming the image.

On the other hand, in step S16, when the letter and photo image distinguishing mode is selected, the image data sent to the image processing unit 4 reaches to the letter and photo image distinguishing circuit 37 after passing through the dot reforming circuits 33a–35a and the scanner gamma conversion circuits 33b–35c. The letter and photo image distinguishing circuit 37 distinguishes a letter image from other images including a screened dot image and a photo image based on the input gray scale data as shown in FIG. 3(b), by judging firstly a difference in a black and white contrast at an edge portion of the gray scale data of every picture element, for separating a letter image and a screened dot image from a photo image, and then applying a pattern matching method for filtering the letter image only. Then, in consequence, the gray scale data adjusting circuits 40 adjusts and reforms a data signal with the corresponding parameters, in accordance with the result of the above-mentioned judgment as to whether the picture element is a letter image or not, so as to drive the write data process circuit 41 accordingly.

Next, the program goes to step S19 after the completion of the preliminary scanning process. In step S19, a judgment is made as to whether or not the copy start key 60 is depressed during the preliminary scanning process. When no depression is detected, the program goes to the next process step, but when a depression is detected, the program goes to a copying process step.

A depression of the copy start key 60 is temporarily memorized by setting to 1 a flag in the RAM of the system control unit 2, and after the completion of the preliminary scanning process, the CPU of the system control unit 2 checks if this flag is 1. When the flag is detected to be 1, a copy process starts automatically and seamlessly following the completion of the preliminary scanning, and the flag is reset to 0 when the copy process is completed.

When a depression of the copy start key 60 is recognized in step S11, the process jumps to step S20 which is described next.

Step S20 judges whether a mode that the preliminary scanning starts at a detection of an original document is being selected or not. When a depression of the touch-sensing message key 93, ("when original document is detected"), shown on the display page 95 of the LCD (liquid crystal display) panel 65 is detected, judgment is executed that the preliminary scanning start time at the detection of the original document is selected. At the same time, it is recognized that one preliminary scanning has been already executed after the detection of the original document and therefore further preliminary scanning upon depression of the copy start key 60 is neglected.

On the other hand, in step 20, when the depression of the touch-sensing message key 93, ("when original document is detected"), is not detected, judgment is executed that the message key 94, ("when copy start key is depressed"), shown on the display page 95 of the LCD panel 65 has been selected and accordingly a preliminary scanning is executed at the depression of the copy start key 60, and the program goes to the next steps S21 and S22.

In steps 21 and 22, the preliminary scanning process starts and is executed in accordance with the mode of the automatic color selecting or the letter and photo mixed mode which has been set before the depression of the copy start key 60. Then, the program goes to a copying process.

Figure 13:
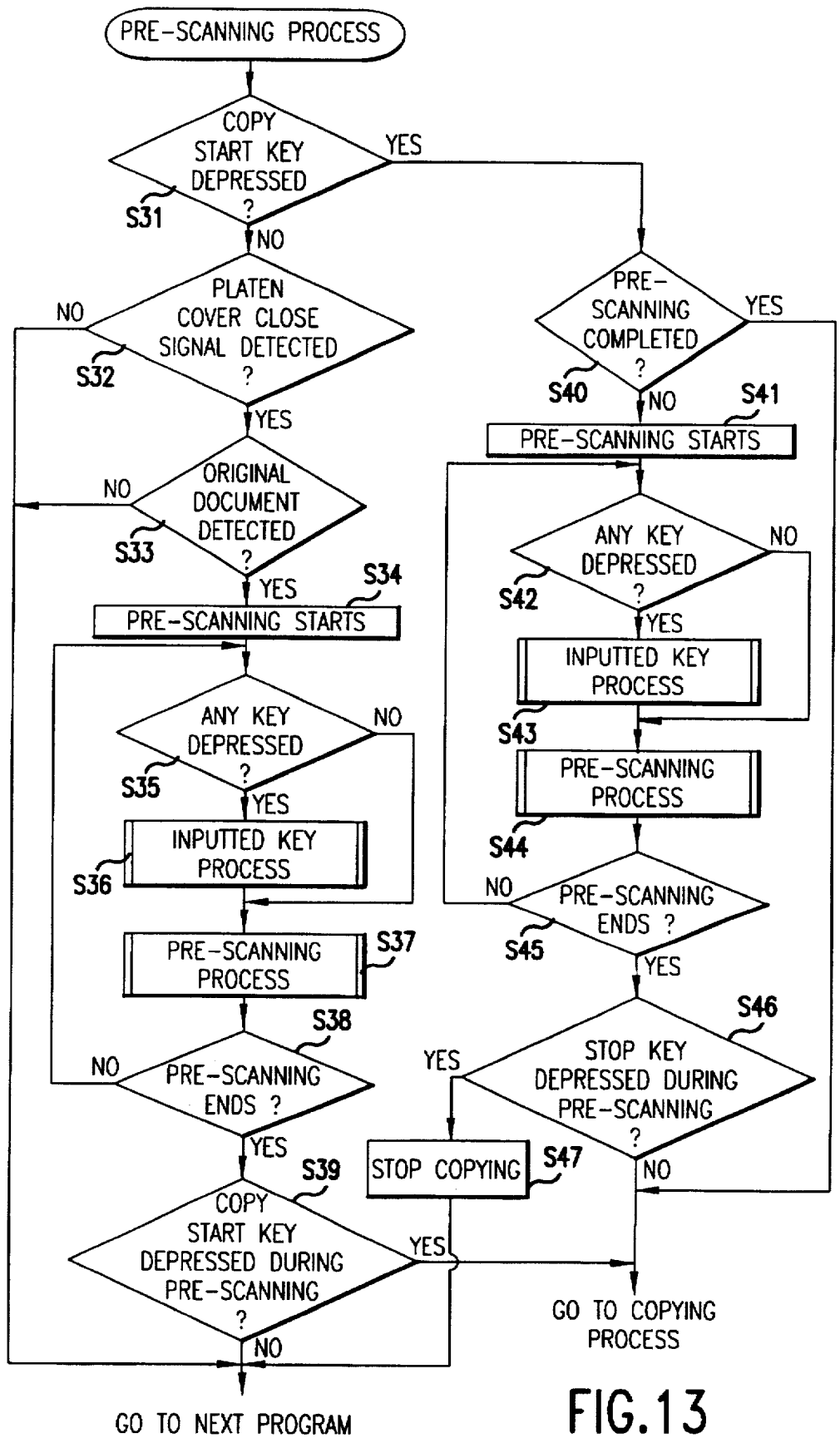
FIGS. 13 and 14 are flowcharts illustrating performance of preliminary scanning under differing operational circumstances.
Figure 14:
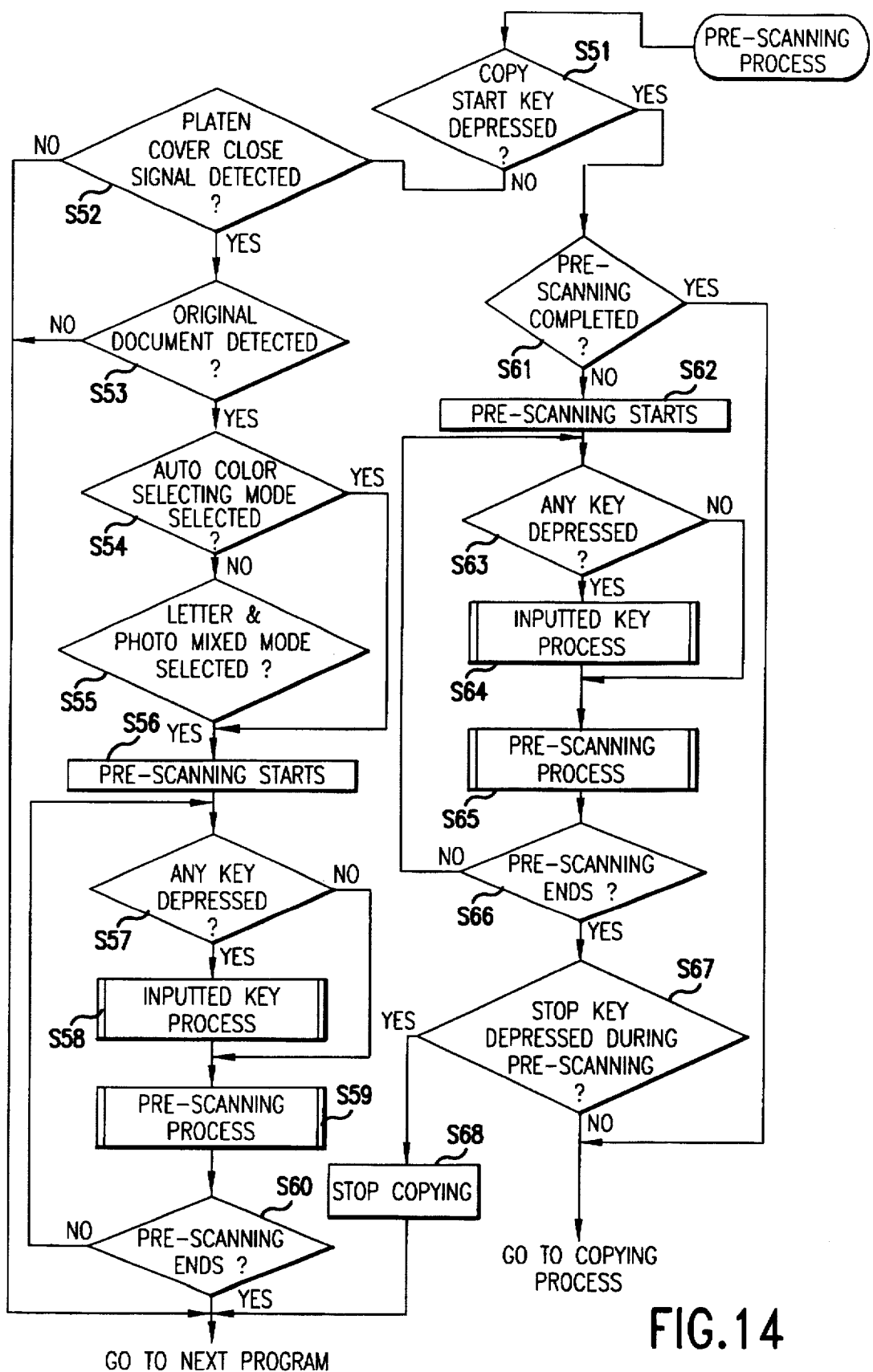

FIGS. 13 and 14 are flowcharts explaining the steps of preliminary scanning performed in the event that key inputs for specifying, for example, a number of copies, and/or, the automatic image density adjustment mode, and the like are made through the operation unit 13 during preliminary scanning. In the flowchart of FIG. 13, neither an automatic color selecting mode nor a letter and photo mixed mode is included, while in the flowchart of FIG. 14 both the automatic color selecting mode and the letter and photo mixed mode are included.

Accordingly, operation of preliminary scanning controlled by the system control unit 2, when neither an automatic color selecting mode nor a letter and photo mixed mode is included, is next explained with respect to the flowchart shown in FIG. 13.

First, step S31 judges whether or not the copy start key 60 is depressed. When no depression is detected, the program goes to step S32 for performing further judgment.

Next, step S32 judges whether or not the system control unit 2 receives the cover close signal outputted from the CPU of the image reading unit 3. When no cover close signal is received, the program jumps to another process. However, when the judgment is made as that the cover close signal is received in step S32, the size of an original document is recognized, and the program goes to step S33 for performing further judgment.

Next, step S33 judges if the system control unit 2 receives the signal indicating the existence of the original document from the CPU of the image reading unit 3. When no signal is received, the program goes to another process. Or, when a judgment is made as that the signal is received, the system control unit 2 judges that the existence is detected, and the program goes to step S34.

Next, step S34 starts the preliminary scanning process, and upon a completion of step S34, the program goes to step S35. In performing the preliminary scanning, as described above, the original document is radiated by moving the light source 23 and the mirror unit for a distance corresponding to the longitudinal length of the original document, and the image of the original document radiated by the light source 23 is read through the CCD 24. The image data read by the CCD 24 are amplified through the amplifiers 26a–28a, and after being converted from analog data to digital data through the A/D (analog to digital) converters 26b–28b, the image data are sent to the image process unit 4 through the shading circuits 29–31 and the line delay correction memories 32a–32c.

Next, step S35 checks whether or not an instruction is inputted during preliminary scanning. The instruction may be given by inputting a numeric through the ten-key pad 55 for specifying, for example, a number of copies, or, by depressing a key through the touch-sensing-panel key pad 64, for example, an automatic color selecting mode, a letter and photo mixed mode, an automatic color selecting mode, a letter and photo mixed mode, an automatic image density adjustment mode, an automatic paper tray selection mode, a manual paper insertion mode, a full size copy mode, and the like. The program goes to step S36 when an instruction is detected, or jumps to step S37 when an instruction is not detected.

If an instruction is detected, then step S36 performs a program corresponding to the inputted key process for processing the instruction given by such inputted key. The program then goes to step S37 when step S36 is completed.

Next, step S37 performs preliminary scanning when the program of the inputted key process is completed by step S36, or, when step S35 judges that there is no instruction key input during preliminary scanning. Upon a completion of step S37, the program goes to step S38.

In preliminary scanning, the image data is processed as described below, when the automatic color selecting mode 66 is selected.

The image data sent to the image process unit 4 reaches the automatic color selecting circuit 36 after passing through the dot reforming circuits 33a–35a and the scanner gamma conversion circuits 33b–35b.

When a gap between a maximum value and a minimum value among gray scale data of R, G, and B in a picture element is smaller than a prescribed value, the automatic color selecting circuit 36 judges that the picture element is a non-color picture element and is a black and white picture element. And, when continuity and frequency of appearance of a color picture element, measured on all picture elements generated in one scanning process, exceeds a prescribed value, the automatic color selecting circuit 36 further judges that the scanned image is a full color image. The system control unit 2 receives feedback signals from the automatic color selecting circuit 36, and consequently determines a mode for forming the image, either in the black and white mode or in the full color mode, and instructs the development unit 8, the drum unit 6, and so forth, so as to operate in such determined mode. As an example, when the black and white mode is selected, only the development device Bk is activated for forming the image, but when a full color mode is selected, the four development devices, Y, M, C, and Bk are activated for forming the image.

On the other hand, when the letter and photo mixed mode is selected, the image data sent to the image processing unit 4 reaches to the letter and photo image distinguishing circuit 37 after passing through the dot reforming circuits 33a–35a and the scanner gamma conversion circuits 33b–35b. The letter and photo image distinguishing circuit 37 distinguishes a letter image from other images including a screened dot image and a photo image based on the input gray scale data as shown in FIG. 3(b), by judging firstly a difference in a black and white contrast at an edge portion of the gray scale data of every picture element, for separating a letter image and a screened dot image from a photo image, and then applying a pattern matching method for filtering the letter image only. Then, in consequence, the gray scale data adjusting circuit 40 adjusts and reforms a data signal with the corresponding parameters, in accordance with the result of the above-mentioned judgment as to whether the picture element is a letter image or not, so as to drive the write data process circuit 41 accordingly.

Next, step S38 judges whether or not preliminary scanning is completed. The program goes to step S35 when preliminary scanning is not completed, or goes to step S39 when preliminary scanning is completed.

Next, if preliminary scanning is completed, step S39 judges whether or not the copy start key 60 is depressed during preliminary scanning. When no depression is detected, the program goes to another process, or goes to a copying process when a depression is detected.

A depression of the copy start key 60 is temporarily memorized in the way of setting a flag to 1 in the RAM of the system control unit 2, and after the completion of preliminary scanning, the CPU of the system control unit 2 checks if the flag is 1. When the flag is detected as 1, a copy process starts automatically and seamlessly following the completion of the preliminary scanning process, and the flag is reset to 0 when the copy process is completed.

When a depression of the copy start key 60 is recognized in step S31, the process goes to step S40 which is described next.

Next, step S40 judges whether or not preliminary scanning is completed. The program proceeds to the copying process when preliminary scanning is completed, or goes to step S41 when preliminary scanning is not completed.

At step S41, preliminary scanning is started, and upon a completion of step S41, the program goes to step S42.

Next, step S42 checks whether or not an instruction key is depressed during preliminary scanning. The instruction may be made during preliminary scanning by inputting a numeric through the ten-key pad 55 for specifying, for example, a number of copies, or, by depressing keys through the touch-sensing-panel key pad 64, for example, an automatic color selecting mode, a letter and photo mixed mode, an automatic image density adjustment mode, an automatic paper tray selection mode, a manual paper insertion mode, a full size copy mode, and the like. The program goes to step S43 when the instruction is detected, or, jumps to step S44 when the instruction is not detected.

Next, when an instruction is detected, step S43 performs a program corresponding to the inputted key instruction for processing the instruction given by such inputted key. The program then goes to step S44 when step S43 is completed.

Next, step S44 performs preliminary scanning when the program corresponding to the inputted key is completed by step S43, or, when step S42 judges that there is no instruction key input during preliminary scanning. Then, the program moves from step S44 to step S45.

Next, step S45 judges whether or not preliminary scanning is completed. The program goes to step S42 when preliminary scanning is not completed, or, goes to step S46 when preliminary scanning is completed.

At step S46, it is judged whether or not the clear and stop key 61 is depressed during preliminary scanning. The program goes to the copying process when the judgment is made that the clear and stop key 61 is not depressed during preliminary scanning. Or, when the judgment is made that the clear and stop key 61 is depressed, the program goes to step S47.

At step S47, the copying process is stopped. After stopping the copying process, the program goes to another process.

Next, the preliminary scanning controlled by the system control unit 2, in a case that both the automatic color selecting mode and the letter and photo mixed mode are included, is explained with respect to the flowchart shown in FIG. 14.

Firstly, step S51 judges whether or not the copy start key 60 is depressed. When no depression is detected, the program moves from step S51 to step S52 for performing further judgment.

Next, step S52 judges whether or not the system control unit 2 receives the cover close signal outputted from the CPU of the image reading unit 3. When no cover close signal is received, the program jumps to another process. However, when the judgment is made as that the cover close signal is received in step S52, a size of an original document is recognized, and the program goes to step S53 for performing further judgment.

Next, step S53 judges if the system control unit 2 receives the signal indicating the existence of the original document from the CPU of the image reading unit 3. The program jumps to another process when no signal is received, or, goes to step S54 when the signal is detected.

Next, step S54 judges whether or not the automatic color selecting mode 66 is depressed. The program jumps to step S56 when the depression is detected, or, goes to step S55 for performing further judgment when the depression is not detected.

At step S55, it is judged whether or not the letter and photo mixed mode 67 is depressed. The program jumps to another process when the depression is not detected, or, goes to step S56 when the depression is detected.

At step S56, preliminary scanning is started. Upon a completion of step S56, the program goes to step S57.

Next, step S57 checks whether or not an instruction is given during preliminary scanning. The instruction may be made during preliminary scanning by inputting a numeric through the ten-key pad 55 for specifying, for example, a number of copies, or, by depressing a key through the touch-sensing panel key pad 64, for example, an automatic color selecting mode, a letter and photo mixed mode, an automatic image density adjustment mode, and automatic paper tray selection mode, a manual paper insertion mode, a full size copy mode, and the like. The program goes to step S58 when the instruction is detected, or, jumps to step S59 when the instruction is not detected.

At step S58, a program corresponding to the inputted key instruction given by such inputted key is performed. Then, the program goes to step S59 when step S58 is completed.

Next, step S59 performs preliminary scanning when the program corresponding to the inputted key is completed at step S58, or, when step S57 judges that there is no instruction key input during preliminary scanning. Upon a completion of step S59, the program goes to step S60.

Next, step S60 judges whether or not preliminary scanning is completed. The program goes to step S57 when preliminary scanning is not completed, or, jumps to another process when preliminary scanning is completed.

When the depression of the copy start key 60 is recognized in step S51, the program goes to step S61 which is described next.

Next, step S61 judges whether or not preliminary scanning is completed. The program jumps to the copying process when preliminary scanning is completed, or, goes to step S62 when preliminary scanning is not completed.

AT step S62, preliminary scanning is started, and upon a completion of step S62, the program goes to step S63.

Next, step S63 checks whether or not an instruction key is depressed during preliminary scanning, as described above. The program goes to step S64 when the instruction is detected, or, jumps to step S65 when the instruction is not detected.

At step S64, a program corresponding to the inputted key instruction is performed. Upon a completion of step S64, the program goes to step S65.

Next, step S65 performs preliminary scanning when the program corresponding to the inputted key process is completed by step S64, or, when step S63 judges no instruction key input during preliminary scanning, as described above. Upon a completion of preliminary scanning, the program goes to step S66.

Next, step S66 judges whether or not preliminary scanning is completed. The program goes to step S63 when preliminary scanning is not completed, or, jumps to step S67 when preliminary scanning is completed.

At step S67, it is judged whether or not the clear and stop key 61 is depressed during preliminary scanning. The program goes to the copying process when the judgement is made as that the clear and stop key is not depressed during preliminary scanning. On the other hand, when the judgment is made as that the clear and stop key is depressed, it is recognized that a certain change is made on the original instruction, for example, a stop of copying. In such case, the program goes to step S68 which is described next.

Next, step S68 stops the copying process. After stopping the copying process, the program goes to another process.

One aspect of the present invention is improved communication between an operator and a digital copying machine through an operation panel unit. It occurs quite often that a machine running under computer instructions does not operate in synchronism with timing of a human action. For example, when an operator wishes to instruct copy start by depressing a copy start key, the operator usually needs to wait until the machine ends the preliminary scanning process for depressing a copy start key 60. According to the present invention, however, when a depression of the copy start key 60 is detected during the preliminary scanning process, the system control 2 stores the detected information temporarily in the RAM, and, after the completion of the preliminary scanning process, the depression of the copy start key 60 becomes effective and a following scanning process for copying continues thereafter.

Another aspect of the present invention involves savings of copying time and energy. The digital copying machine 1 performs the preliminary scanning process in an effective manner for saving copying time and energy based on the size of an original document. The system control unit 2 controls limits of an effective area for a preliminary scanning motion conducted by the image reading unit 3 in accordance with the size of an original document, based on the feedback signals from the original document size detect sensors 81–83. For example, when the CPU of the image reading unit 3 judges the size of the original document as a standard A5 in a portrait position based on the output signals from the original document size detect sensors 81–83, the image reading unit 3 receives an instruction from the system control unit 2 to move a mirror unit, which is mounted on the image reading unit 3 and includes the light source 23, for a distance corresponding to the longitudinal limit of A5 portrait size.

While the present invention is explained in connection with a digital copying machine, the functions of the invention concern the preliminary reading function for reading an image of the original document prior to starting a copy process so as to preset internal conditions in advance. Therefore, the invention is not limited to a digital copying machine but can be practiced in any device which manipulates images, such as a personal or professional scanner device to be connected to any kind of computers.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An image forming apparatus having a contact glass on which an original document is to be placed, comprising:

means for holding an original document placed at a designated position on the contact glass;

first detecting means for detecting an open state and a closed state of said means for holding;

second detecting means for detecting an existence of an original document placed at the designated position on the contact glass;

means for optically scanning an image of an original document placed at the designated position on the contact glass;

means for executing an image data recognition and processing;

means for forming an image onto a copy sheet in accordance with output signals generated from said means for executing an image data recognition and processing; and means for controlling said means for optically scanning to perform a preliminary scanning prior to a scanning process for forming an image onto a copy sheet, said preliminary scanning being performed automatically upon a detection by said first detecting means of movement of said means for holding from an open state to a closed state and upon a detection by said second detecting means of existence of an original document placed at the designated position on the contact glass.

2. An image forming apparatus according to claim 1, wherein said means for executing comprises at least one of:

means for distinguishing between a color image and a non-color image; and means for distinguishing among a letter image, a screened dot image, and a photo image.

3. An image forming apparatus having a contact glass on which an original document is to be placed, comprising:

means for holding an original document placed at a designated position on the contact glass;

first detecting means for detecting an open state and a closed state of said means for holding;

second detecting means for detecting an existence of an original document placed at the designated position on the contact glass;

means for optically scanning an image of an original document placed at the designated position on the contact glass;

means for executing an image data recognition and processing, including at least one of means for distinguishing between a color image and a non-color image, and means for distinguishing among a letter image, a screened dot image, and a photo image;

means for forming an image onto a copy sheet in accordance with output signals generated from said means for executing an image data recognition and processing;

means for selecting at least one of a mode for automatically distinguishing between a color image and a non-color image and a mode for automatically distinguishing among a letter image, a screened dot image and a photo image; and means for controlling said means for optically scanning to perform a preliminary scanning prior to a scanning process for forming an image onto a copy sheet, said preliminary scanning being performed automatically upon a detection of a selection by said means for selecting of the at least one of the mode for automatically distinguishing between a color image and a non-color image and the mode for automatically distinguishing among a letter image, a screened dot image, and a photo image, a detection by said first detecting means of movement from an open state to a closed state of said means for holding, and a detection by the second detecting means of existence of an original document placed at the designated position on the contact glass.

4. An image forming apparatus according to claim 1, 2, or 3, wherein said means for controlling instructs said means for forming an image onto a copy sheet to start a process of forming an image onto a copy sheet automatically upon a completion of a preliminary scanning process, upon detecting a copy start instruction during the preliminary scanning process.

5. An image forming apparatus according to claim 1, 2 or 3, wherein said means for controlling accepts an instruction inputted by an operator during a preliminary scanning process and executes the accepted instruction.

6. An image forming apparatus according to claim 4, wherein said means for controlling accepts an instruction inputted by an operator during the preliminary scanning process and executes the accepted instruction.

7. An image forming apparatus having a contact glass on which an original document is to be placed, comprising:

means for holding an original document placed at a designated position on the contact glass;

first detecting means for detecting an open state and a closed state of said means for holding;

second detecting means for detecting an existence of an original document placed at the designated position on the contact glass;

means for optically scanning an image of an original document placed at the designated position on the contact glass;

means for executing an image data recognition and processing;

means for forming an image onto a copy sheet in accordance with output signals generated from said means for executing;

means for selecting one of a mode for automatically starting a preliminary scanning prior to a scanning process for forming an image onto a copy sheet upon a detection by said first detecting means for movement from an open state to a closed state of said means for holding and a detection by said second detecting means for existence of an original document and a mode for automatically starting a preliminary scanning prior to a scanning process for forming an image onto a copy sheet upon a reception of a copy start instruction; and means for controlling said means for optically scanning to perform a preliminary scanning prior to a scanning process for forming an image onto a copy sheet, said preliminary scanning being performed automatically, upon a detection by said first detecting means of movement from an open state to a closed state of said means for holding and a detection by said second detecting means of existence of an original document placed at the designated position on the contact glass when a mode for automatically starting said preliminary scanning upon a detection by said first detecting means of movement from an open state to a closed state of said means for holding and a detection by said second detecting means of existence of an original document is selected, and upon a detection of a copy start instruction when a mode from automatically starting said preliminary scanning upon a reception of a copy start instruction is selected.

8. An image forming apparatus having a contact glass on which an original document is to be placed, comprising:

means for holding an original document placed at a designated position on the contact glass;

first detecting means for detecting an open state and a closed state of said means for holding;

second detecting means for detecting an existence of an original document placed at the designated position on the contact glass;

means for optically scanning an image of an original document placed at the designated position on the contact glass;

means for executing an image data recognition and processing, including at least one of means for distinguishing between a color image and a non-color image, and means for distinguishing among a letter image, screened dot image, and a photo image;

means for forming an image onto a copy sheet in accordance with output signals generated from said means for executing;

means for selecting at least one of a mode for automatically distinguishing between a color image and a non-color image and a mode for automatically distinguishing among a letter image, a screened dot image, and a photo image;

means for selecting one of a mode for automatically starting a preliminary scanning process prior to a scanning process for forming an image onto a copy sheet upon a detection of a selection by said means for selecting of at least one of a mode for automatically distinguishing between a color image and a non-color image and a mode for distinguishing among a letter image, a screened dot image, and a photo image, upon a detection by said first detecting means of movement from an open state to a closed state of said means for holding, and upon a detection by said second detecting means of existence of an original document and a mode for automatically starting a preliminary scanning prior to a scanning process for forming an image onto a copy sheet upon a reception of a copy start instruction; and means for controlling said means for optically scanning to perform a preliminary scanning prior to a scanning process for forming an image onto a copy sheet, said preliminary scanning being performed automatically, upon a detection by said first detecting means of movement from an open state to a closed state of said means for holding and a detection by said second detecting means of existence of an original document placed at the designated position on the contact glass when a mode for automatically starting said preliminary scanning upon a detection of a selection by said means for selecting at least one of a mode for automatically distinguishing between a color image and a non-color image and a mode for distinguishing among a letter image, a screened dot image, and a photo image, a detection by said first detecting means of movement from an open state to a closed state of said means for holding, and a detection by said second detecting means of existence of an original document, is selected, and upon a detection of a copy start instruction when a mode for automatically starting said preliminary scanning upon a reception of a copy start instruction is selected.

9. An image forming apparatus according to claim 7, wherein said means for controlling controls said means for forming an image onto a copy sheet to start forming an image onto the copy sheet automatically upon a completion of the preliminary scanning process, upon a detection of a copy start instruction during the preliminary scanning process when a mode for automatically starting said preliminary scanning upon a detection by said first detecting means of movement from an open state to a closed state of said means for holding and a detection by said second detecting means of existence of an original document is selected.

10. An image forming apparatus according to claim 8, wherein said means for controlling controls said means for forming an image onto a copy sheet to start forming an image onto the copy sheet automatically upon a completion of the preliminary scanning process, upon a detection of a copy start instruction during the preliminary scanning process when a mode for automatically starting said preliminary scanning upon a detection of a selection by said means for selecting at least one of a mode for automatically distinguishing between a color image and a non-color image and a mode for distinguishing among a letter image, a screened dot image, and a photo image, a detection by said first detecting means of movement from an open state to a closed state of said means for holding, and a detection by said second detecting means of existence of an original document, is selected.

11. An image forming apparatus according to claim 1, 2, 3, 7, or 8, wherein said second detecting means includes an original document size detection sensor to detect a size of an original document placed on the contact glass, and said means for controlling controls the scanning distance in the direction of the travel in accordance with the size detected by said original document size detection sensor.

12. An image forming apparatus according to claim 4, wherein said second detecting means includes an original document size detection sensor to detect a size of an original document placed on the contact glass, and said means for controlling controls the scanning distance in the direction of the travel in accordance with the size detected by said original document size detection sensor.

13. An image forming apparatus according to claim 5, wherein said second detecting means includes an original document size detection sensor to detect a size of an original document placed on the contact glass, and said means for controlling controls the scanning distance in the direction of the travel in accordance with the size detected by said original document size detection sensor.

14. An image forming apparatus according to claim 6, wherein said second detecting means includes an original document size detection sensor to detect a size of an original document placed on the contact glass, and said means for controlling controls the scanning distance in the direction of the travel in accordance with the size detected by said original document size detection sensor.

15. An image forming apparatus according to claim 9, wherein said second detecting means includes an original document size detection sensor to detect a size of an original document placed on the contact glass, and said means for controlling controls the scanning distance in the direction of the travel in accordance with the size detected by said original document size detection sensor.

16. An image forming apparatus having a contact glass on which an original document is to be placed, comprising:
- a document holding cover for holding an original document placed at a designated position on the contact glass;
- a document holding cover detector for detecting an open state and a closed state of said document holding cover;
- a document detector for detecting an existence of an original document placed at the designated position on the contact glass;
- an image scanner for optically scanning an image of an original document placed at the designated position on the contact glass and producing corresponding image data;
- a device for recognizing and processing the image data;
- an image forming device for forming an image onto a copy sheet in accordance with output signals generated from said device for recognizing and processing; and
- a controller for controlling said image scanner to perform a preliminary scanning prior to a scanning process for forming an image onto a copy sheet, said preliminary scanning being performed automatically upon a detection by said document holding cover detector of movement from an open state to a closed state of said document holding cover, and a detection by said document detector of existence of an original document placed at the designated position on the contact glass.

17. An image forming apparatus according to claim 16, wherein said device for recognizing and processing includes at least one of means for distinguishing between a color image and a non-color image, and means for distinguishing among a letter image, a screened dot image, and a photo image.

18. An image forming apparatus having a contact glass on which an original document is to be placed, comprising:
- a document holding cover for holding an original document placed at a designated position on the contact glass;
- a document holding cover detector for detecting an open state and a closed state of said document holding cover;
- a document detector for detecting an existence of an original document placed at the designated position on the contact glass;
- an image scanner for optically scanning an image of an original document placed at the designated position on the contact glass and producing image data;
- a device for recognizing and processing the image data, which includes at least one of means for distinguishing between a color image and a non-color image, and means for distinguishing among a letter image, a screened dot image, and a photo image;
- an image forming device for forming an image onto a paper in accordance with output signals generated from said device for recognizing and processing;
- a mode selector for selecting at least one of a mode for automatically distinguishing between a color image and a non-color image and a mode for automatically distinguishing among a letter image, a screened dot image and a photo image; and
- a controller for controlling said image scanner to perform a preliminary scanning process prior to a scanning process for forming an image onto a copy sheet, said preliminary scanning being performed automatically upon a detection of a selection by the mode selector of the at least one of the mode for automatically distinguishing between a color image and a non-color image and the mode for automatically distinguishing among a letter image, a screened dot image, and a photo image, a detection by said document holding cover detector of movement from an open state to a closed state of said document holding cover, and a detection by said document detector of existence of an original document placed at the designated position on the contact glass.

19. An image forming apparatus according to claim 16, 17, or 18, wherein said controller instructs said image forming device to start forming an image onto a paper automatically upon a completion of the preliminary scanning process upon a detection of a copy start instruction during the preliminary scanning process.

20. An image forming apparatus according to claim 16, 17 or 18, wherein said controller accepts an instruction inputted by an operator during the preliminary scanning process and makes the instruction effective.

21. An image forming apparatus according to claim 19, wherein said controller accepts an instruction inputted by an operator during the preliminary scanning process and makes the instruction effective.

22. An image forming apparatus having a contact glass on which an original document is to be placed, comprising:
- a document holding cover for holding an original document placed at a designated position on the contact glass;
- a document holding cover detector for detecting an open state and a closed state of the document holding cover;
- a document detector for detecting an existence of an original document placed at the designated position on the contact glass;
- an image scanner for optically scanning an image of an original document placed at the designated position on the contact glass;
- a device for recognizing and processing image data;
- an image forming device for forming an image onto a paper in accordance with output signals generated from said device for recognizing and processing;
- a device for selecting one of a mode for automatically starting a preliminary scanning prior to a scanning process for forming an image onto a copy sheet upon a detection by said document holding cover detector of movement from an open state to a closed state of said document holding cover and a detection by said document detector of existence of an original document and a mode for automatically starting a preliminary scanning prior to a scanning process for forming an image onto a copy sheet upon a reception of a copy start instruction; and a controller for controlling said image scanner to perform a preliminary scanning prior to a scanning process for forming an image onto a copy sheet, said preliminary scanning being performed automatically, upon a detection by said document holding cover detector of movement from an open state to a closed state of said document holding cover and a detection by said document detector of existence of an original document placed at the designated position on the contact glass when a mode for automatically starting said preliminary scanning upon a detection by said document holding cover detector of movement from an open state to a closed state of said document holding cover and a detection by said document detector of existence of an original document is selected, and upon a detection of a copy start instruction when a mode for automatically starting said preliminary scanning upon a reception of a copy start instruction is selected.

23. An image forming apparatus having a contact glass on which an original document is to be placed, comprising:

a document holding cover for holding an original document placed at a designated position on the contact glass;

a document holding cover detector for detecting an open state and a closed sate of the document holding cover;

a document detector for detecting an existence of an original document placed at the designated position on the contact glass;

an image scanner for optically scanning an image of an original document placed at the designated position on the contact glass;

a device for recognizing and processing image data, including at least one of means for distinguishing between a color image and a non-color image, and means for distinguishing among a letter image, screened dot image, and a photo image;

an image forming device for forming an image onto a paper in accordance with output signals generated from said device for recognizing and processing;

a mode selector for selecting at least one of a mode for automatically distinguishing between a color image and a mode for automatically distinguishing among a letter image, a screened dot image, and a photo image;

a device for selecting one of a mode for automatically starting a preliminary scanning prior to a scanning process for forming an image onto a copy sheet upon a detection of a selection by said mode selector of at least one of a mode for automatically distinguishing between a color image and a non-color image and a mode for distinguishing among a letter image, a screened dot image, and a photo image, upon a detection by said document holding cover detector of movement from an open state to a closed state of said document holding cover, and upon a detection by said document detector of existence of an original document and a mode for automatically starting a preliminary scanning prior to a scanning process for forming an image onto a copy sheet upon a reception of a copy start instruction; and a controller for controlling said image scanner to perform a preliminary scanning prior to a scanning process for forming an image onto a copy sheet, said preliminary scanning being performed automatically, upon a detection by said document holding cover detector of movement from an open state to a closed sate of said document holding cover and a detection by said document detector of existence of an original document placed at the designated position on the contact glass when a mode for automatically starting said preliminary scanning upon a detection of a selection by said mode selector of at least one of a mode for automatically distinguishing between a color image and a non-color image and a mode for distinguishing among a letter image, a screened dot image, and a photo image, a detection by said document holding cover detector of movement from an open state to a closed state of said document holding cover, and a detection by said document detector of existence of an original document, is selected, and upon a detection of a copy start instruction when a mode for automatically starting said preliminary scanning upon a reception of a copy start instruction is selected.

24. An image forming apparatus according to claim 22, wherein said controller controls said image forming device to start forming an image onto the copy sheet automatically upon a completion of the preliminary scanning, upon a detection of a copy start instruction during the preliminary scanning when a mode for automatically starting said preliminary scanning upon a detection by said document holding cover detector of movement from an open state to a closed state of said document holding cover and a detection by said document detector of existence of an original document is selected.

25. An image forming apparatus according to claim 23, wherein said controller controls said image forming device to start forming an image onto the copy sheet automatically upon a completion of the preliminary scanning, upon a detection of a copy start instruction during the preliminary scanning when a mode for automatically starting said preliminary scanning upon a detection of a selection by said device for selecting one of a mode for automatically distinguishing between a color image and a non-color image and a mode for distinguishing among a letter image, a screened dot image, and a photo image, a detection by said document holding cover detector of movement from an open state to a closed state of said document holding cover, and a detection by said document detector of existence of an original document, is selected.

26. An image forming apparatus according to claims 16, 17, 18, 22, or 23, wherein said document detector includes an original document size detect sensor to detect a size of an original document placed on the contact glass, and said controller controls a scanning distance in the direction of travel in accordance with the size detected by said original document size detect sensor.

27. An image forming apparatus according to claim 19, wherein said document detector includes an original document size detect sensor to detect a size of an original document placed on the contact glass, and said controller controls a scanning distance in the direction of travel in accordance with the size detected by said original document size detect sensor.

28. An image forming apparatus according to claim 20, wherein said document detector includes an original document size detect sensor to detect a size of an original document placed on the contact glass, and said controller controls a scanning distance in the direction of travel in accordance with the size detected by said original document size detect sensor.

29. An image forming apparatus according to claim 21, wherein said document detector includes an original document size detect sensor to detect a size of an original document placed on the contact glass, and said controller controls a scanning distance in the direction of travel in accordance with the size detected by said original document size detect sensor.

30. An image forming apparatus according to claim 24, wherein said document detector includes an original document size detect sensor to detect a size of an original document placed on the contact glass, and said controller controls a scanning distance in the direction of travel in accordance with the size detected by said original document size detect sensor.

* * * * *